(12) United States Patent
Shu

(10) Patent No.: US 11,417,118 B2
(45) Date of Patent: Aug. 16, 2022

(54) LANE LINE DATA PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Mao Shu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 218 days.

(21) Appl. No.: 16/893,820

(22) Filed: Jun. 5, 2020

(65) Prior Publication Data

US 2020/0302189 A1 Sep. 24, 2020

Related U.S. Application Data

(63) Continuation of application No. PCT/CN2019/076067, filed on Feb. 25, 2019.

(30) Foreign Application Priority Data

Mar. 9, 2018 (CN) .......................... 201810194981.6

(51) Int. Cl.
*G06V 20/56* (2022.01)
*G06N 3/08* (2006.01)
*G06V 10/24* (2022.01)

(52) U.S. Cl.
CPC ............. *G06V 20/588* (2022.01); *G06N 3/08* (2013.01); *G06V 10/245* (2022.01)

(58) Field of Classification Search
CPC ....... G06V 20/588; G06V 10/245; G06N 3/08
See application file for complete search history.

(56) References Cited

U.S. PATENT DOCUMENTS

| 2018/0181817 A1* | 6/2018 | Yan ..................... G06V 20/588 |
| 2018/0260636 A1* | 9/2018 | Zou ........................... G06T 7/70 |
| 2019/0035101 A1* | 1/2019 | Kwant ................. G06V 20/588 |

FOREIGN PATENT DOCUMENTS

| CN | 102592114 | 7/2012 |
| CN | 105260699 | 1/2016 |

(Continued)

OTHER PUBLICATIONS

International Search Report with English translation and Written Opinion regarding PCT/CN2019/076067 dated May 30, 2019, 10 pages.

(Continued)

*Primary Examiner* — Myron Wyche
(74) *Attorney, Agent, or Firm* — Crowell & Moring LLP

(57) ABSTRACT

The present disclosure describes methods, device, and storage medium for obtaining lane line data of a road. The method includes obtaining and dividing, by a device, road-image data of a road into at least one segment. The device includes a memory storing instructions and a processor in communication with the memory. The method includes processing, by the device, each segment to obtain a two-dimensional grayscale image of each segment; extracting, by the device using a pre-trained deep neural network model, a lane line area and a lane line attribute in each two-dimensional grayscale image, to obtain a lane line area image of each segment; and splicing, by the device, each lane line area image based on corresponding road-image data and the lane line attribute, to obtain lane line data of the road.

14 Claims, 17 Drawing Sheets

(56) References Cited

FOREIGN PATENT DOCUMENTS

| CN | 105448184 | * | 3/2016 | ......... G09B 29/0005 |
|---|---|---|---|---|
| CN | 106873600 | | 6/2017 | |
| CN | 106951847 | | 7/2017 | |
| CN | 107330380 | * | 11/2017 | ......... G09B 29/0005 |
| CN | 107403163 | | 11/2017 | |
| CN | 108470159 | | 8/2018 | |

OTHER PUBLICATIONS

Chinese Office Action with concise English translation regarding Appl No. 2018101949816 dated Jun. 17, 2019, 10 pages.

* cited by examiner

LANE LINE DATA PROCESSING METHOD
AND APPARATUS, COMPUTER DEVICE,
AND STORAGE MEDIUM

RELATED APPLICATION

This application is a continuation application of PCT Patent Application No. PCT/CN2019/076067, filed on Feb. 25, 2019, which claims priority to Chinese Patent Application No. 201810194981.6, filed with the National Intellectual Property Administration, P.R. China on Mar. 9, 2018, both of which are incorporated herein by reference in their entireties.

FIELD OF THE TECHNOLOGY

This application relates to the field of map data processing technologies, and in particular, to a lane line data processing method and apparatus, a computer device, and a storage medium.

BACKGROUND OF THE DISCLOSURE

A high-precision map is core content of self-driving, provides a vehicle with rich road information, and assists the vehicle in positioning, navigation, and decision-making. A lane line is core data on a lane, is the most important content in the high-precision map, and is a prerequisite for ensuring correct driving of the vehicle and safety of self-driving.

Currently, the lane line depends on manual extraction. The lane line is completely edited manually during manual extraction, and the lane line is drawn point by point on point cloud data. As mass production of the high-precision map gradually begins, a higher requirement is imposed on production efficiency of map elements such as a lane lines.

SUMMARY

According to various embodiments of this application, a lane line data processing method and apparatus, a computer device, and a storage medium are provided.

The present disclosure describes a method for obtaining lane line data of a road. The method includes obtaining and dividing, by a device, road-image data of a road into at least one segment. The device includes a memory storing instructions and a processor in communication with the memory. The method includes processing, by the device, each segment to obtain a two-dimensional grayscale image of each segment; extracting, by the device using a pre-trained deep neural network model, a lane line area and a lane line attribute in each two-dimensional grayscale image, to obtain a lane line area image of each segment; and splicing, by the device, each lane line area image based on corresponding road-image data and the lane line attribute, to obtain lane line data of the road.

The present disclosure describes a device for obtaining lane line data of a road. The device includes a memory storing instructions; and a processor in communication with the memory. When the processor executes the instructions, the processor is configured to cause the device to obtain and dividing road-image data of a road into at least one segment, process each segment to obtain a two-dimensional grayscale image of each segment, extract, using a pre-trained deep neural network model, a lane line area and a lane line attribute in each two-dimensional grayscale image, to obtain a lane line area image of each segment, and splice each lane line area image based on corresponding road-image data and the lane line attribute, to obtain lane line data of the road.

The present disclosure describes a non-transitory computer readable storage medium storing computer readable instructions. The computer readable instructions, when executed by a processor, are configured to cause the processor to perform obtaining and dividing road-image data of a road into at least one segment; processing each segment to obtain a two-dimensional grayscale image of each segment; extracting, using a pre-trained deep neural network model, a lane line area and a lane line attribute in each two-dimensional grayscale image, to obtain a lane line area image of each segment; and splicing each lane line area image based on corresponding road-image data and the lane line attribute, to obtain lane line data of the road.

A lane line data processing method includes:
  obtaining and dividing three-dimensional point cloud data of a to-be-processed road;
  processing each segment of three-dimensional point cloud data obtained by dividing, to obtain a two-dimensional grayscale image of each segment of three-dimensional point cloud data;
  extracting, by using a pre-trained deep neural network model, a lane line area and a lane line attribute in each two-dimensional grayscale image, to obtain a lane line area image corresponding to each two-dimensional grayscale image; and
  splicing each lane line area image according to three-dimensional point cloud data corresponding to the lane line area image and the lane line attribute, to obtain lane line data of the to-be-processed road.

In one of the embodiments, the splicing each lane line area image according to three-dimensional point cloud data corresponding to the lane line area image and the lane line attribute, to obtain lane line data of the to-be-processed road includes:
  performing sampling to obtain a key point of the lane line area in the lane line area image, to obtain a lane line key point image of the lane line area image;
  obtaining three-dimensional coordinate information corresponding to the key point according to a spatial mapping relationship between the two-dimensional grayscale image and the three-dimensional point cloud data; and
  splicing each lane line key point image according to the three-dimensional coordinate information of each key point and the lane line attribute, to obtain the lane line data of the to-be-processed road.

In one of the embodiments, the performing sampling to obtain a key point of the lane line area in the lane line area image, to obtain a lane line key point image of the lane line area image includes:
  processing, for each lane line area image, the lane line area into a single-pixel lane line, to obtain a lane line image corresponding to each lane line area image; and
  performing sampling to obtain a key point of a lane line in each lane line image, to obtain a lane line key point image of the lane line image.

In one of the embodiments, before the splicing each lane line key point image according to the three-dimensional coordinate information of each key point and the lane line attribute, to obtain the lane line data of the to-be-processed road, the method further includes:
  filtering a noise lane line in the lane line key point image according to a lane line spacing and a lane line length in the lane line key point image.

In one of the embodiments, the processing each segment of three-dimensional point cloud data obtained by dividing, to obtain a two-dimensional grayscale image of each segment of three-dimensional point cloud data includes:

performing orthographic projection on each segment of three-dimensional point cloud data obtained by dividing, to obtain a two-dimensional image corresponding to each segment of three-dimensional point cloud data; and performing gray processing on each two-dimensional image, to obtain a corresponding two-dimensional grayscale image.

In one of the embodiments, before the performing orthographic projection on each segment of three-dimensional point cloud data obtained by dividing, to obtain a two-dimensional image corresponding to each segment of three-dimensional point cloud data, the method further includes: performing coordinate conversion on the three-dimensional point cloud data according to a movement track direction of a map collector for collecting the three-dimensional point cloud data.

In one of the embodiments, the method further includes:

breaking, according to a quantity of lane lines, and a starting location and an ending location of each lane line, a lane line obtained through splicing to obtain a divided interval, to obtain lane line data of the divided interval.

In one of the embodiments, the processing, for each lane line area image, the lane line area into a single-pixel lane line, to obtain a lane line image corresponding to each lane line area image includes: deleting, for each lane line area image according to an eight-connected principle, some pixels of the lane line area and retaining a skeleton of the lane line area image, to obtain the lane line image corresponding to each lane line area image.

A lane line data processing apparatus includes:

a point cloud data processing module, configured to obtain and divide three-dimensional point cloud data of a to-be-processed road;

an image processing module, configured to process each segment of three-dimensional point cloud data obtained by dividing, to obtain a two-dimensional grayscale image of each segment of three-dimensional point cloud data;

an extraction module, configured to extract, by using a pre-trained deep neural network model, a lane line area and a lane line attribute in each two-dimensional grayscale image, to obtain a lane line area image corresponding to each two-dimensional grayscale image; and a splicing module, configured to splice each lane line area image according to three-dimensional point cloud data corresponding to the lane line area image and the lane line attribute, to obtain lane line data of the to-be-processed road.

In one of the embodiments, the splicing module includes:

a key point processing module, configured to perform sampling to obtain a key point of the lane line area in the lane line area image, to obtain a lane line key point image of the lane line area image;

a key point coordinate obtaining module, configured to obtain three-dimensional coordinate information corresponding to the key point according to a spatial mapping relationship between the two-dimensional grayscale image and the three-dimensional point cloud data; and a splicing processing module, configured to splice each lane line key point image according to the three-dimensional coordinate information of each key point and the lane line attribute, to obtain the lane line data of the to-be-processed road.

In one of the embodiments, the image processing module includes:

a projecting module, configured to perform orthographic projection on each segment of three-dimensional point cloud data obtained by dividing, to obtain a two-dimensional image corresponding to each segment of three-dimensional point cloud data; and a gray processing module, configured to perform gray processing on each two-dimensional image, to obtain a corresponding two-dimensional grayscale image.

In one of the embodiments, the image processing module further includes:

a coordinate conversion module, configured to perform coordinate conversion on the three-dimensional point cloud data according to a movement track direction of a map collector for collecting the three-dimensional point cloud data.

In one of the embodiments, the apparatus further includes:

a breaking module, configured to break, according to a quantity of lane lines, and a starting location and an ending location of each lane line, a lane line obtained through splicing to obtain a divided interval, to obtain lane line data of the divided interval.

A computer device includes a memory and a processor, the memory storing a computer program, and the computer program, when executed by the processor, causing the processor to perform steps of the foregoing method.

A computer-readable storage medium stores a computer program, the computer program, when executed by a processor, causing the processor to perform steps of the foregoing method.

Details of one or more embodiments of this application are provided in the accompany drawings and description below. Other features, objectives, and advantages of this application become apparent from descriptions of the specification, the accompanying drawings, and the claims.

BRIEF DESCRIPTION OF THE DRAWINGS

To describe the technical solutions of the embodiments of the present application or the existing technology more clearly, the following briefly introduces the accompanying drawings required for describing the embodiments or the existing technology. Apparently, the accompanying drawings in the following description show only some embodiments of the present application, and a person of ordinary skill in the art may still derive other drawings from the accompanying drawings without creative efforts.

DESCRIPTION OF EMBODIMENTS

Figure 1:
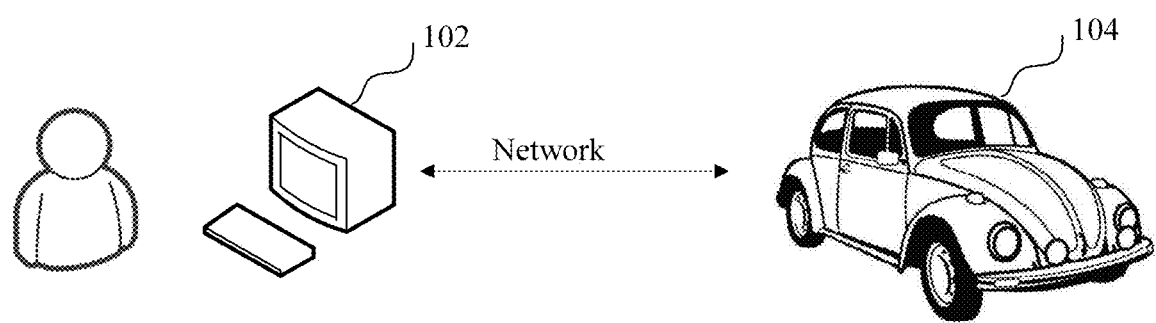
FIG. 1 is a diagram of an application environment of a lane line data processing method according to an embodiment.

The device and methods now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements.

Likewise, many modifications and other embodiments of the device and methods described herein will come to mind to one of skill in the art to which the disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Unless defined otherwise, all technical and scientific terms used herein have the same meaning as commonly understood by one of skill in the art to which the disclosure pertains. Although any methods and materials similar to or equivalent to those described herein may be used in the practice or testing of the present disclosure, the preferred methods and materials are described herein.

FIG. 1 is a diagram of an application environment of a lane line data processing method according to an embodiment. Referring to FIG. 1, a computer device 102 is connected to an intelligent traveling device 104 through a network, and the computer device 102 is configured to make a high-precision map. The intelligent traveling device 104 downloads the high-precision map from the computer device 102 through the network to implement intelligent driving. The intelligent traveling device may run a lane line editing system for the computer device 102 such as an intelligent vehicle or a robot for making the high-precision map. A map editor can operate the computer device 102 to load and display a lane line on the computer device 102. Lane line data, obtained by using the lane line data processing method according to this application, is represented by a key point. The map editor conveniently views a lane line extraction result by using the lane line editing system and does not need to modify lane line data whose extraction accuracy meets a requirement, thereby greatly reducing workload of the editor and improving editing efficiency. The computer device 102 may be specifically a desktop terminal, a notebook computer, or the like. The network may be a wired or wireless network of any communication protocol. The intelligent traveling device 104 and the computer device 102 are displayed as two independent components in the figure, but in another embodiment, the computer device 102 may alternatively be integrated into the intelligent traveling device 104.

Figure 2:
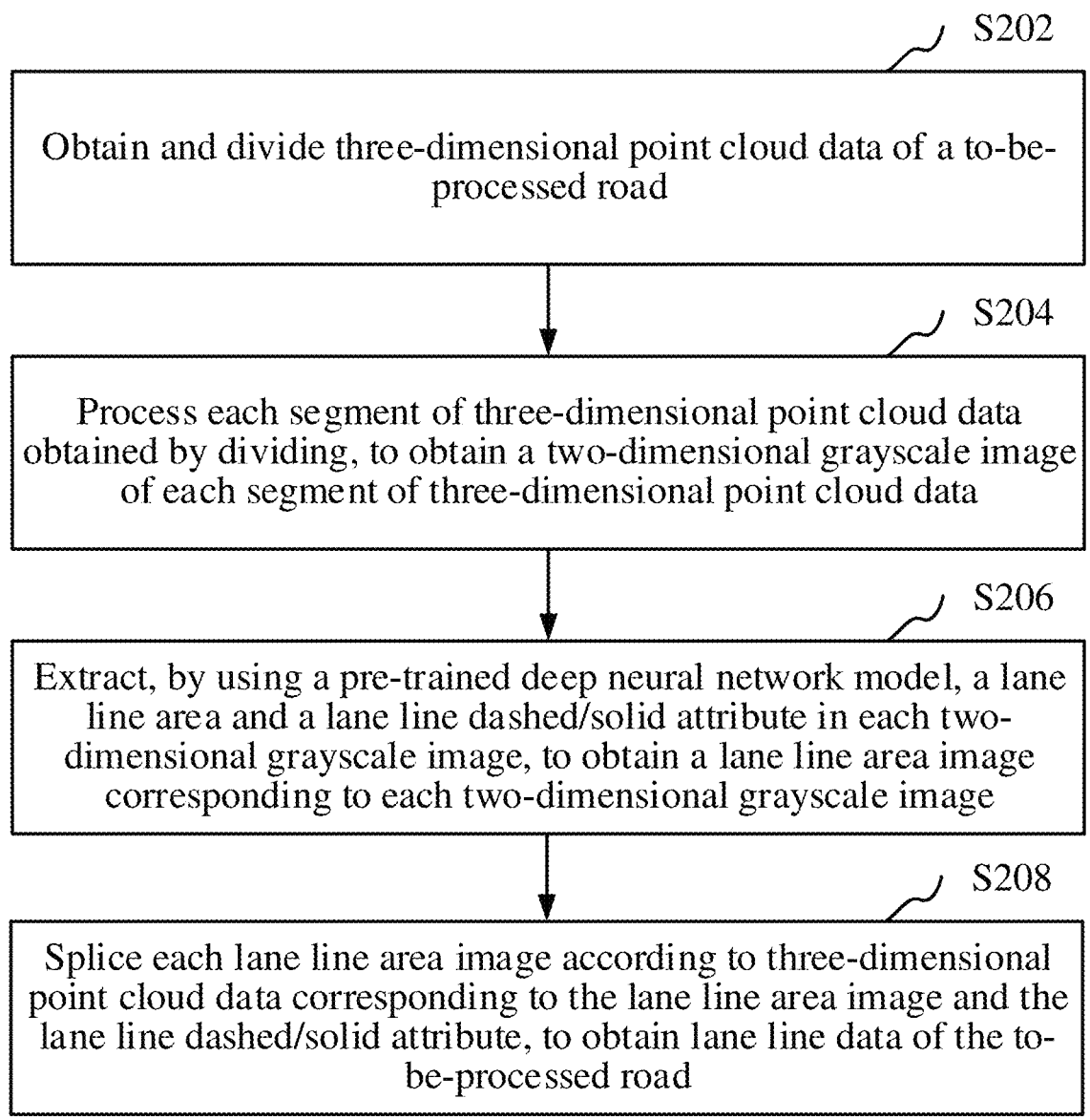
FIG. 2 is a schematic flowchart of a lane line data processing method according to an embodiment.

As shown in FIG. 2, in an embodiment, a lane line data processing method is provided. In this embodiment, description is made mainly by using an example in which the method is applied to the computer device 102 in FIG. 1. Referring to FIG. 2, the lane line data processing method specifically includes the following steps:

S202. Obtain and divide three-dimensional point cloud data of a to-be-processed road. In one implementation, road-image data of a road may include the three-dimensional point cloud data of a to-be-processed road.

The to-be-processed road is a road, being a target processing object of a map editor and a specific road, for example, an expressway with a number of G21. The three-dimensional point cloud data of the to-be-processed road is collected by using a map collector. The map collector includes an unmanned aerial vehicle, a map collecting vehicle, or the like. The map collector is provided with a laser scanner. During driving on a road, a point data set of a road surface, that is, three-dimensional point cloud data of the road is obtained by using the laser scanner. The three-dimensional point cloud data, obtained according to a laser measuring principle, includes three-dimensional coordinates and a laser reflection strength.

Specifically, a step of obtaining and dividing three-dimensional point cloud data of a to-be-processed road includes: obtaining the three-dimensional point cloud data of the to-be-processed road and dividing the three-dimensional point cloud data into a plurality of segments.

Generally, three-dimensional laser point cloud data collected by the map collector, for example, the map collecting vehicle, is entire point cloud data of the road. Due to a large amount of data, the point cloud data cannot be usually represented on one grayscale image. Therefore, in this embodiment, the three-dimensional point cloud data of the to-be-processed road is divided into the plurality of segments. Specifically, three-dimensional point cloud data of every fixed-length road may be divided into a segment, for example, three-dimensional point cloud data of every 45-m road is divided into a segment. In one implementation, a road-laser-image data may include the three-dimensional laser point cloud data.

S204. Process each segment of three-dimensional point cloud data obtained by dividing, to obtain a two-dimensional grayscale image of each segment of three-dimensional point cloud data. In one implementation, road-image data of a road may include the three-dimensional point cloud data of a to-be-processed road.

Figure 3:
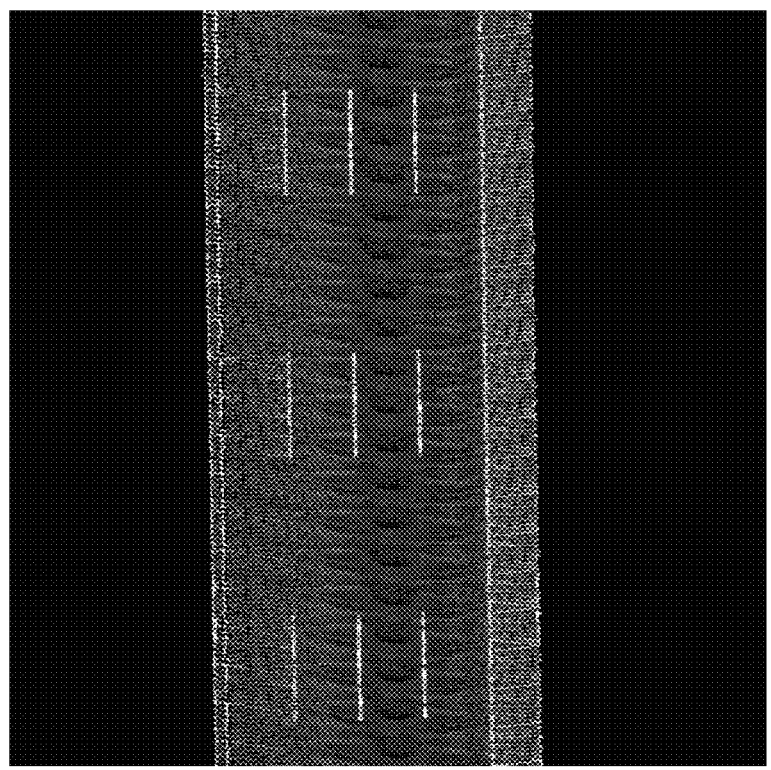
FIG. 3 is a two-dimensional grayscale image corresponding to a specific segment of road according to an embodiment.

In this embodiment, the three-dimensional point cloud data of the to-be-processed road is divided into the plurality of segments, and each segment of three-dimensional point cloud data obtained by dividing is processed separately. Specifically, each segment of three-dimensional point cloud data is projected onto a grayscale image to obtain the two-dimensional grayscale image of each segment of three-dimensional point cloud data. Roads of two-dimensional grayscale images are continuous, so that a two-dimensional grayscale image of a completed road can be obtained through splicing. In an embodiment, a two-dimensional grayscale image corresponding to a specific segment of road is shown in FIG. 3.

S206. Extract, by using a pre-trained deep neural network model, a lane line area and a lane line attribute in each two-dimensional grayscale image, to obtain a lane line area image corresponding to each two-dimensional grayscale image. The lane line attributes may include a lane line dashed/solid attribute.

The lane line area refers to an area formed by lane lines in the two-dimensional grayscale image. Connected pixels corresponding to the lane lines in the two-dimensional grayscale image are extracted as an area to obtain the lane line area.

The lane line attributes may include a lane line dashed/solid attribute, which indicates whether the line is a dashed line or a solid line. In traffic marking, a dashed lane line indicates that driving may be performed on the line temporarily. A solid lane line is used for separation. For example, a double-yellow line is marked in a road segment and used for separating traffic of driving in opposite directions.

In this embodiment, the deep neural network model used for extracting the lane line area and the lane line attribute is pre-trained. The deep neural network model is trained based on a large quantity of marked two-dimensional grayscale images. In a training sample during model training, for the solid line, a solid line location is directly marked; and for the dashed line, a blank between two segments of dashed lines is connected to obtain a continuous line as a marking result. In this way, the deep neural network model is helped to learn a forward and backward extending relationship of the lane line, to filter out noises such as some characters and ground marks.

Figure 4:
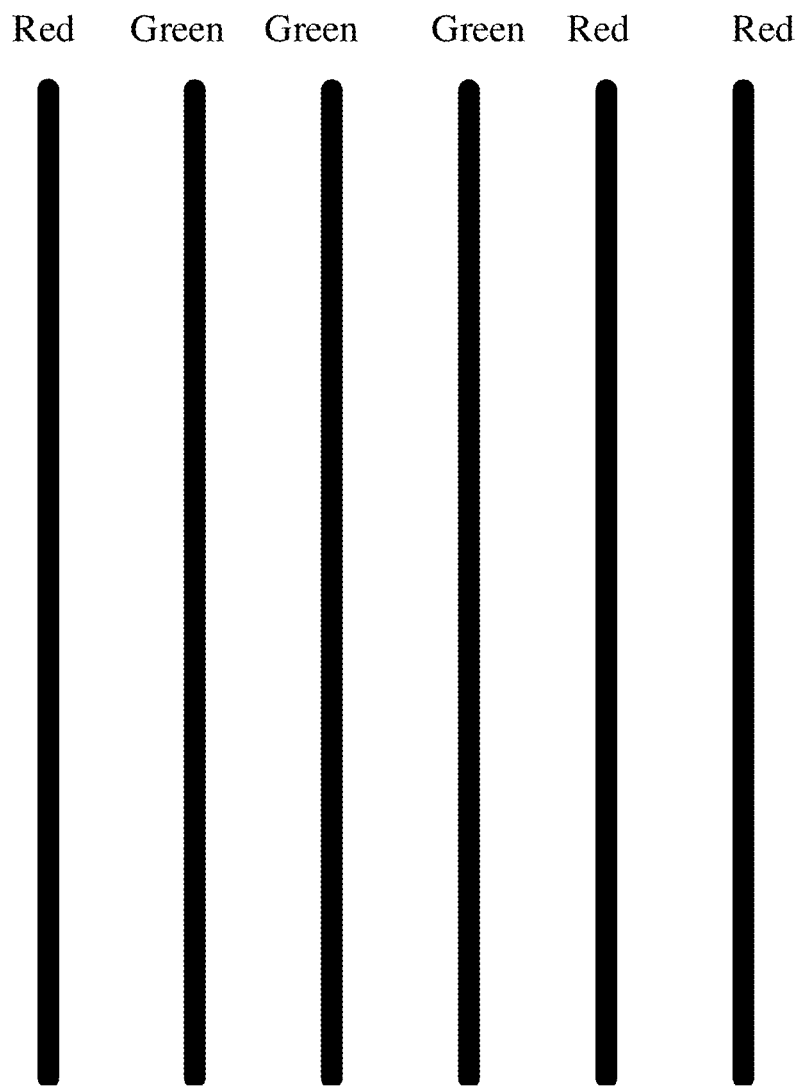
FIG. 4 is a schematic diagram of a lane line extraction result according to an embodiment.

During model training, a deep neural network model is trained by using a marked lane line sample and is stored after the model is converged. A two-dimensional grayscale image of a to-be-processed road is inputted in a prediction stage, and the model extracts a lane line area and a dashed/solid attribute from the two-dimensional grayscale image. In an embodiment, a lane line extraction result is shown in FIG. 4. In actual processing, lines with different colors may be used for representing solid lines and dashed lines. As shown in FIG. 4, a green line represents a dashed lane line, and a red line represents a solid lane line.

Specifically, in an embodiment, the deep neural network model may have a structure of a VGG basic network (VGGNet) and a structure of spatial pyramid pooling. A dilated convolution is used between network layers, a deconvolution operation is used for upsampling, and a loss function may include a weighted cross entropy loss. In one implementation, a structure of the deep neural network model is shown in FIG. 5.

Figure 5:
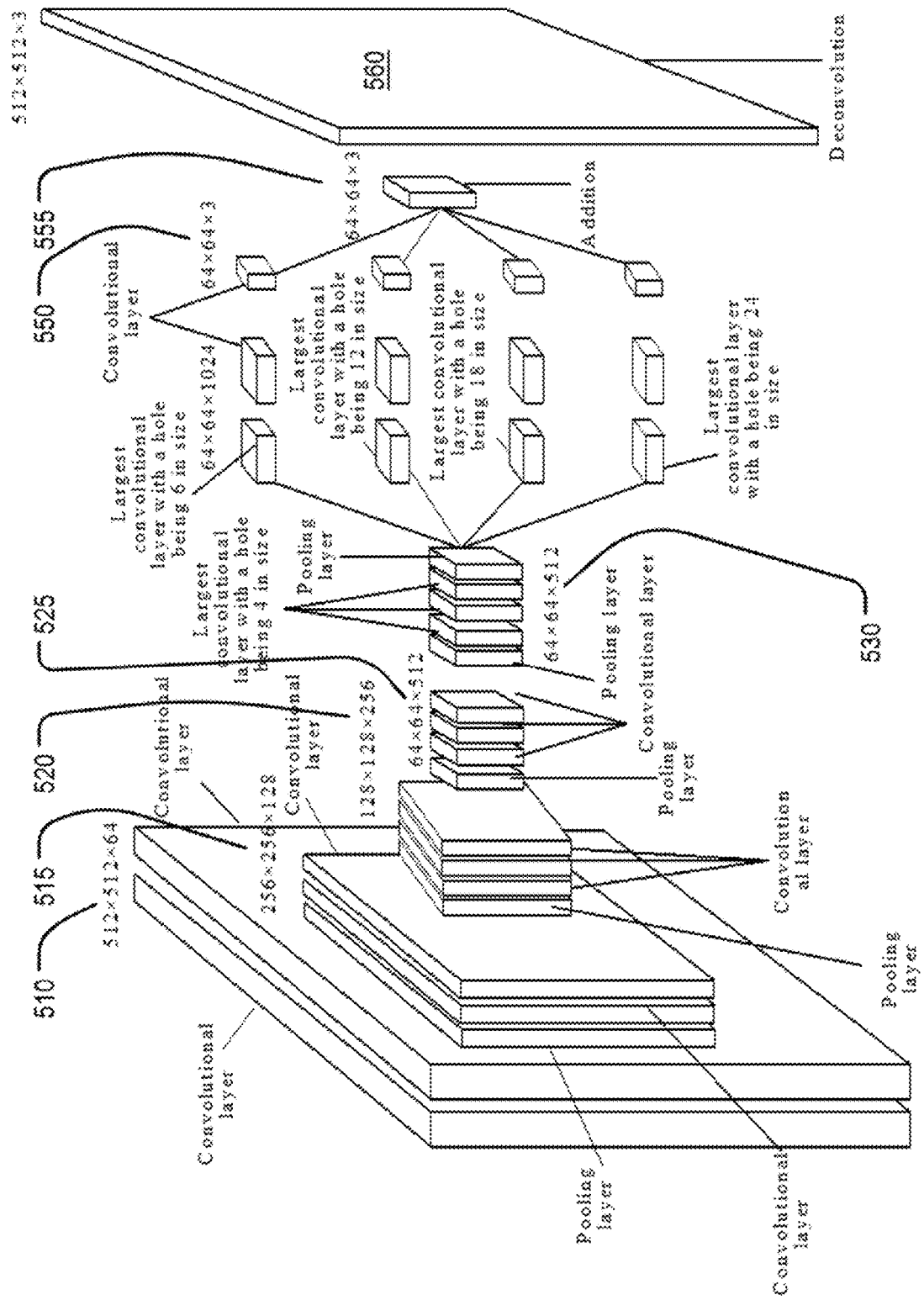
FIG. 5 is a schematic structural diagram of a deep neural network model according to an embodiment.

Specifically, a process of extracting, by using a deep neural network model, a lane line area and a lane line attribute in a two-dimensional grayscale image is as follows:

Referring to FIG. 5, first, a point cloud grayscale image with a size of 512*512 is inputted, 64 feature images of 512*512 (510) are obtained through two convolutional layers, and downsampling is performed by using a pooling layer, to obtain 64 feature images with a size of 256*256. Next, 128 feature images of 256*256 (515) continue to be obtained through two convolutional layers and 128 feature images of 128*128 are obtained after pooling. Then, 256 feature images of 128*128 (520) are obtained through three convolutional layers and 256 feature images of 64*64 are obtained after pooling. Subsequently, 512 feature images of 64*64 (525) continue to be obtained through three convolutional layers, and a pooling layer operation with a step of 1 is performed, so that the size of the feature image is not reduced. Then, 512 feature images of 64*64 (530) are obtained through three dilated convolutional layers with holes being 4 in size. Subsequently, information is transmitted in 4 channels, 3 feature images of 64*64 (550) are obtained through a dilated convolutional layer and two conventional convolutional layers for each channel, and sizes of holes of the 4 channels of dilated convolutional layers are respectively 6, 12, 18, and 24. Subsequently, the 4 channels of feature images are added to obtain 3 feature images of 64*64 (555), and each feature image represents a confidence belonging to a specific class (or category). The 3 feature images may correspond to three classes (or categories), for example, a background class/category, a dashed lane line class/category, and a solid lane line class/category, respectively.

Finally, an 8-time deconvolution upsampling operation is performed on the 3 feature images of 64*64, to obtain 3 feature images with a size of 512*512 (560) that is the same size as the inputted image. For each location (or pixel) on the feature image, the class/category with the largest value of the location/pixel in the 3 feature images is the class/category to which a location corresponding to the inputted image belongs.

As a quantity of network layers increases, a quantity of feature images gradually increases, and the size of the feature image gradually decreases, so that the network can extract higher-level semantic information, and a quantity of network parameters can be reduced. Convolution (that is, spatial pyramid pooling) is performed on a plurality of channels of information on different hole sizes, and prediction results on receptive fields with different sizes may be obtained. A small receptive field facilitates refined prediction on a local area, and a large receptive field facilitates prediction with reference to global semantic information.

In another embodiment, another neural network structure, for example, a convolutional neural network, including a convolutional layer, a sampling layer, a fully connected layer, and an output layer may alternatively be used by the deep neural network model, and each of an input and an output of the convolutional layer is a multi-matrix. The convolutional layer includes a plurality of convolution kernels, and each convolution kernel is a matrix and is equivalent to a filter. Each convolution kernel may output a specific feature image, and each feature image is an output unit of the convolutional layer. Then, the feature image is further transmitted to a next layer by using a non-linear activation function (for example, a ReLU). For example, a rectified linear unit (ReLU) may include an activation function in deep learning models, which returns 0 if it receives any negative input, and returns the value back when it receives any non-negative input.

The function of the convolutional layer is to detect a local feature from the output of a previous layer, but different from the convolutional layer, the function of the sampling layer is to combine features with similar meanings into the same feature, and combine features in adjacent locations to closer locations. After a plurality of layers of convolution and padding, the feature image needs to be outputted in a form of class. The convolutional layer and the pooling layer only extract the feature and reduce parameters brought by the original image. However, to generate the final output, the fully connected layer needs to be used for generating an output equal to a quantity of required classes. In this application, there are three classes in total that are a background class, a dashed lane line class, and a solid lane line class respectively. The output layer has a loss function similar to a classification cross entropy and is used for calculating a prediction error. A gradient calculation and parameter training process of the convolutional neural network is the same as that of a conventional deep network, and all parameters in the convolution kernel are trained.

In this embodiment, a lane line in a larger visual range is extracted by using the deep neural network model, which is not easily affected by interference items (for example, arrows/markings on the ground, characters/texts, and/or vehicles) in the point cloud and has stronger robustness compared with a common machine learning method.

S208. Splice each lane line area image according to three-dimensional point cloud data corresponding to the lane line area image and the lane line attribute, to obtain lane line data of the to-be-processed road.

The three-dimensional point cloud data corresponding to each lane line area image is obtained by using a spatial mapping relationship between the two-dimensional grayscale image and the three-dimensional point cloud data. The three-dimensional point cloud data of the road includes three-dimensional coordinates. Adjacent lane line area images are spliced according to the three-dimensional coordinates and the lane line attribute. Specifically, whether two lane line area images are adjacent (that is, whether the road is continuous) is determined according to the three-dimensional coordinates. For two adjacent lane line area images, one lane line area is taken from each image for pairing. If locations of two to-be-paired lane line areas are continuous (coordinates are continuous), and dashed/solid attributes of the lane line areas are the same, the pairing is successful, and it is considered that the two lane line areas in the two lane line area images may be spliced into a long lane line area. By using the method, all lane line area images are spliced in sequence, to obtain a complete lane line area image corresponding to the to-be-processed road.

According to the lane line data processing method, the three-dimensional point cloud data of the to-be-processed road is obtained and divided, each segment of three-dimensional point cloud data obtained by dividing is processed separately, to obtain the two-dimensional grayscale image of each segment of three-dimensional point cloud data, each two-dimensional grayscale image is inputted into the pre-trained deep neural network model, and the lane line area and the lane line attribute are extracted; and the three-dimensional point cloud data of the to-be-processed road includes the three-dimensional coordinates, so that each lane line area image can be spliced according to the three-dimensional point cloud data corresponding to the lane line area and the lane line attribute, to obtain the complete lane line data of the to-be-processed road.

The above described method provides significant improvement in the computer technology of processing lane line data by using the pre-trained deep neural network model to extract the lane line area and the lane line attribute. On one hand, the lane line attribute is obtained and lane line information is enriched, thereby saving manual marking costs and improving processing efficiency. On the other hand, lane line area extraction is not easily affected by interference items such as characters and vehicles in the point cloud data, thereby improving accuracy of the lane line area extraction.

Figure 6:
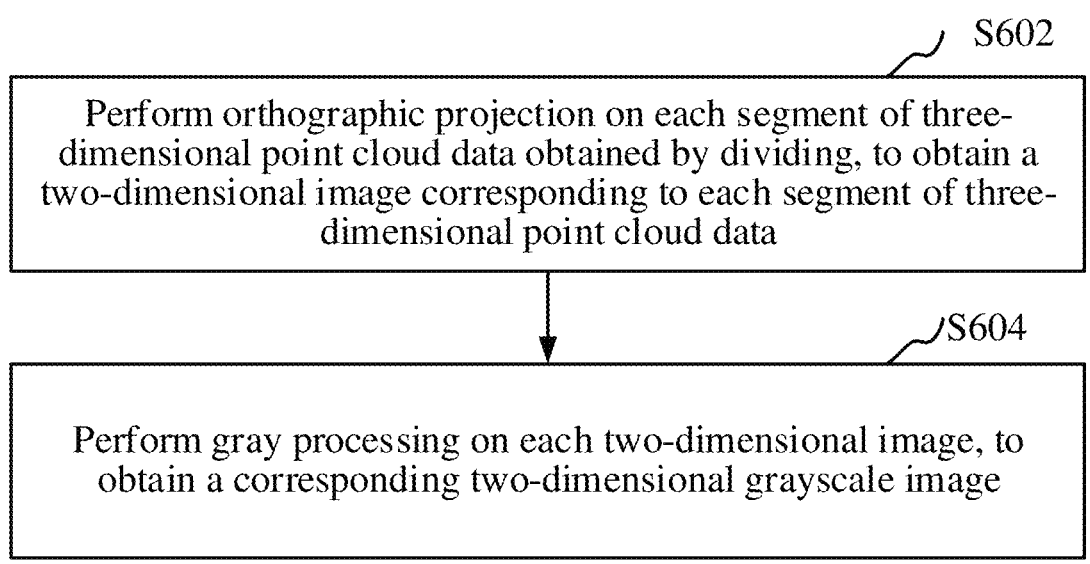
FIG. 6 is a schematic flowchart of a step of processing each segment of three-dimensional point cloud data obtained by dividing, to obtain a two-dimensional grayscale image of each segment of three-dimensional point cloud data according to an embodiment.

In another embodiment, as shown in FIG. 6, a step of processing each segment of three-dimensional point cloud data obtained by dividing, to obtain a two-dimensional grayscale image of each segment of three-dimensional point cloud data includes:

S602. Perform orthographic projection on each segment of three-dimensional point cloud data obtained by dividing, to obtain a two-dimensional image corresponding to each segment of three-dimensional point cloud data. In one implementation, road-image data of a road may include the three-dimensional point cloud data of a to-be-processed road.

The orthographic projection is one type of parallel projection. In this case, a projected line is perpendicular to a projection plane. The orthographic projection does not have a perspective characteristic, but may reflect a real size of an object in a space intuitively. The orthographic projection is performed on a laser point cloud to obtain the two-dimensional image, and a pixel value of the two-dimensional image is in direct proportion to a reflectivity value of the point cloud. In this embodiment, each segment of three-dimensional point cloud data is projected onto one two-dimensional image, and a road corresponding to a data segment, for example, a 45-m road, is displayed on the two-dimensional image, so that a plurality of continuous two-dimensional images corresponding to the three-dimensional point cloud data of the to-be-processed road are obtained.

S604. Perform gray processing on each two-dimensional image, to obtain a corresponding two-dimensional grayscale image.

Specifically, the three-dimensional point cloud data includes a laser reflection strength, and the reflectivity value of the point cloud is normalized into a grayscale value of 0 to 255, to obtain the two-dimensional grayscale image.

In an embodiment, a two-dimensional grayscale image corresponding to a specific segment of road is shown in FIG. 3.

In this embodiment, three-dimensional point cloud data of a to-be-processed road is collected by using a map collector, and a two-dimensional grayscale image of the to-be-processed road is obtained through processing based on the three-dimensional point cloud data, to provide a basis for a deep neural network model to extract a lane line.

To keep a lane line of the two-dimensional image as vertical as possible, and better recognize the lane line subsequently, in an embodiment, before the performing orthographic projection on each segment of three-dimensional point cloud data obtained by dividing, the method further includes: performing coordinate conversion on the three-dimensional point cloud data according to a movement track direction of a map collector for collecting the three-dimensional point cloud data.

Specifically, a conversion formula is:

$$\begin{bmatrix} \overline{X} \\ \overline{Y} \end{bmatrix} = \begin{bmatrix} \cos\theta & -\sin\theta \\ \sin\theta & \cos\theta \end{bmatrix} \begin{bmatrix} X \\ Y \end{bmatrix},$$

where θ represents a steering angle of the map collector, $\overline{X}$ represents a horizontal coordinate after conversion, $\overline{Y}$ represents a vertical coordinate after conversion, X represents a horizontal coordinate before conversion, and Y represents a vertical coordinate before conversion.

After the horizontal coordinate and the vertical coordinate of the three-dimensional point cloud data are converted according to the movement track direction of the map collector, three-dimensional curved data collected by the map collecting vehicle during steering is corrected, so that the lane line in the two-dimensional image obtained after performing orthographic projection remains vertical to facilitate recognition of the lane line by the deep neural network model.

Figure 7:
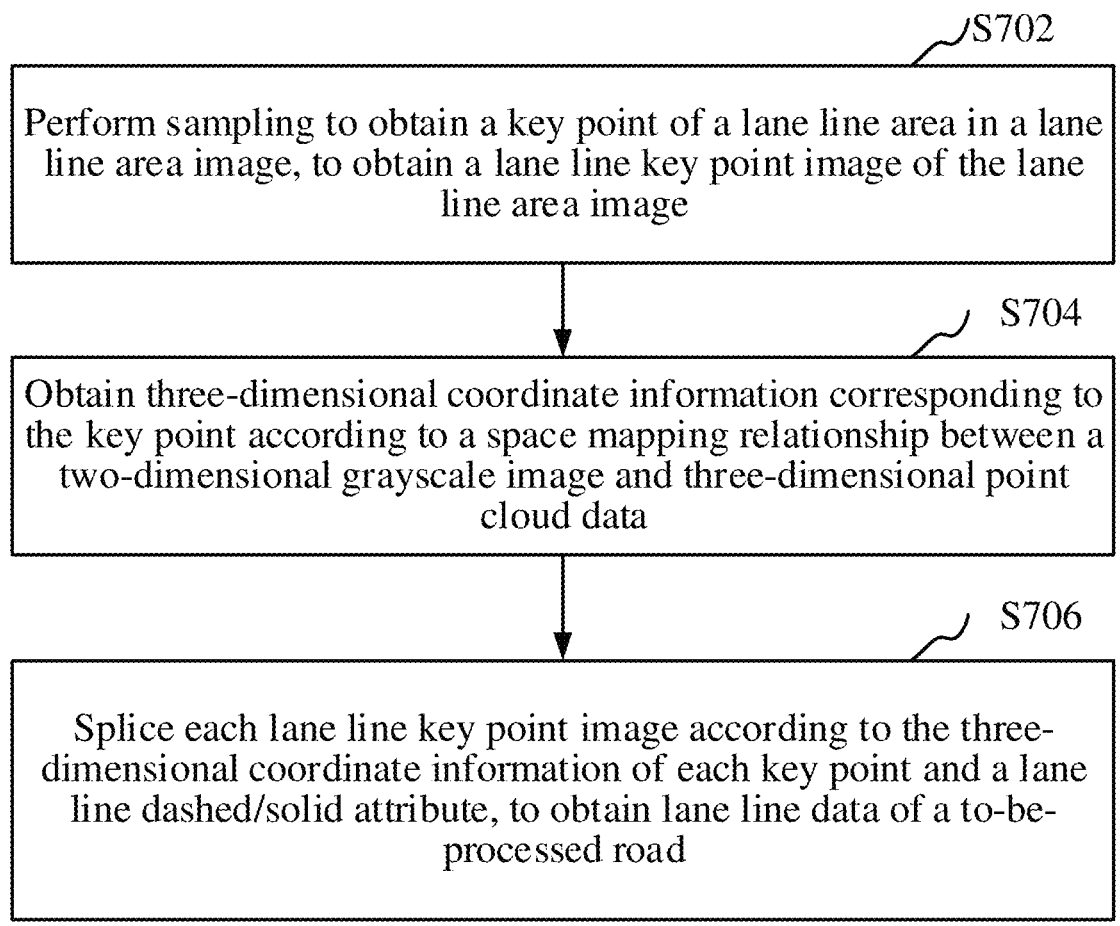
FIG. 7 is a schematic flowchart of a step of splicing each lane line area image according to three-dimensional point cloud data corresponding to a lane line area image and a lane line attribute, to obtain lane line data of a to-be-processed road according to an embodiment.

In an embodiment, as shown in FIG. 7, a step of splicing each lane line area image according to three-dimensional point cloud data corresponding to the lane line area image and the lane line attribute, to obtain lane line data of the to-be-processed road includes:

S702. Perform sampling to obtain a key point of a lane line area in the lane line area image, to obtain a lane line key point image of the lane line area image. In one implementation, step S702 may alternatively include, performing sampling to obtain at least one key point of a lane line area in the lane line area image, to obtain a lane line key point image of the lane line area image based on the at least one key point.

The key point is a sparse point obtained after sampling the lane line area. In actual processing, the lane line area is connected pixels corresponding to a lane line in the two-dimensional grayscale image and occupies a plurality of pixel blocks in width, that is, the extracted lane line area has a relatively large line width. An amount of data of the lane line represented by a line is huge, and when the lane line represented by the line is directly used for high-precision map representation, problems such as a large amount of map data and slow loading and display are caused. In this embodiment, each lane line area is sampled to obtain the key point of the lane line area. The sampling is sampling at equal interval, for example, a point is obtained through sampling every two meters.

The lane line area image roughly extracted by using the deep neural network model may be further refined for high-precision map display. Specifically, a step of performing sampling to obtain a key point of a lane line area in a lane line area image to obtain a lane line key point image of the lane line area image includes: processing, for each lane line area image, the lane line area into a single-pixel lane line to obtain a lane line image corresponding to each lane line area image, and performing sampling to obtain a key point of a lane line in each lane line image to obtain a lane line key point image of the lane line image.

The lane line area refers to an area formed by lane lines in the two-dimensional grayscale image. Connected pixels corresponding to the lane lines in the two-dimensional grayscale image are extracted as an area to obtain the lane line area. In an embodiment, a lane line area extraction result is shown in FIG. 4. The extracted lane line area occupies a plurality of pixel blocks in width. However, the lane line area of the plurality of pixel blocks does not facilitate subsequent calculation. Therefore, in this embodiment, the lane line area is processed into the single-pixel lane line.

Specifically, for each lane line area image, some pixels of the lane line area are deleted according to an eight-connected principle and a skeleton of the lane line area image is retained, to obtain the lane line image corresponding to each lane line area image.

A skeleton is a medial axis of an image and is obtained by refining the image. The skeleton of the lane line area image is a medial axis of the lane line area image. For example, a skeleton of a rectangle is a medial axis of the rectangle in a length direction, and a skeleton of a circle is the center of the circle. The skeleton is generally a single pixel.

Figure 8:
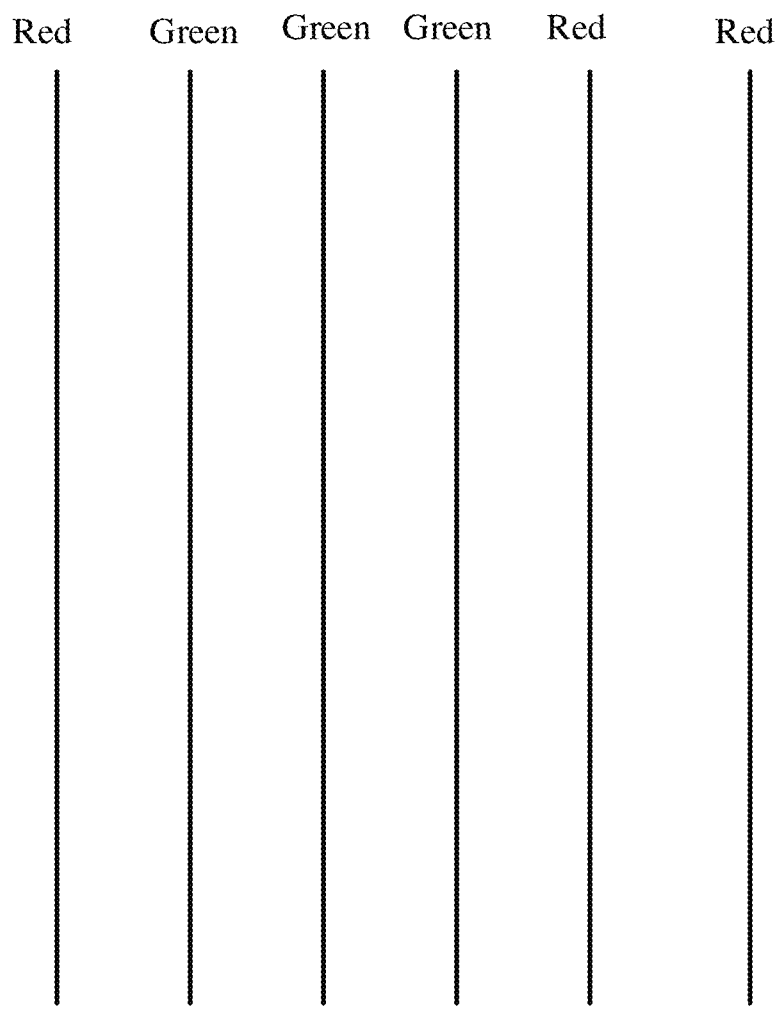
FIG. 8 is a lane line image obtained by processing the lane line area image in FIG. 4 according to an embodiment.

In this application, a lane is refined to obtain the skeleton of the lane line area image. Refining refers to removing some points from the original image but still maintaining an original shape. A situation of eight neighboring points (eight-connected) is used as a determining basis to determine whether a point is removed. The eight neighboring points may include a up point, a down point, a left point, a right point, a up-left point, a up-right point, a down-left point, and a down-right point. The specific determining rules of the eight-connected principle may include: 1, an internal point cannot be deleted; 2, an isolated point cannot be deleted; 3, line end points cannot be deleted; and 4, in a case that a point P is a boundary point, if no connected component is added after the point P is removed, the point P may be deleted. An eight-connected refinement method is used, the lane line is compressed from eight directions at the same time, only a center pixel is retained, redundant pixels are deleted, and the lane line represented by a single pixel is left. FIG. 8 is a lane line image obtained by processing the lane line area image in FIG. 4.

The key point is a sparse point obtained after sampling the lane line area. In actual processing, an amount of data of the lane line represented by a line is huge, and when the lane line represented by the line is directly used for high-precision map representation, problems such as a large amount of map data and slow loading and display are caused. In this embodiment, each lane line is sampled to obtain the key point of the lane line. In one implementation, the sampling may occur at equal interval, for example, a point is obtained through sampling every two meters.

Figure 9:
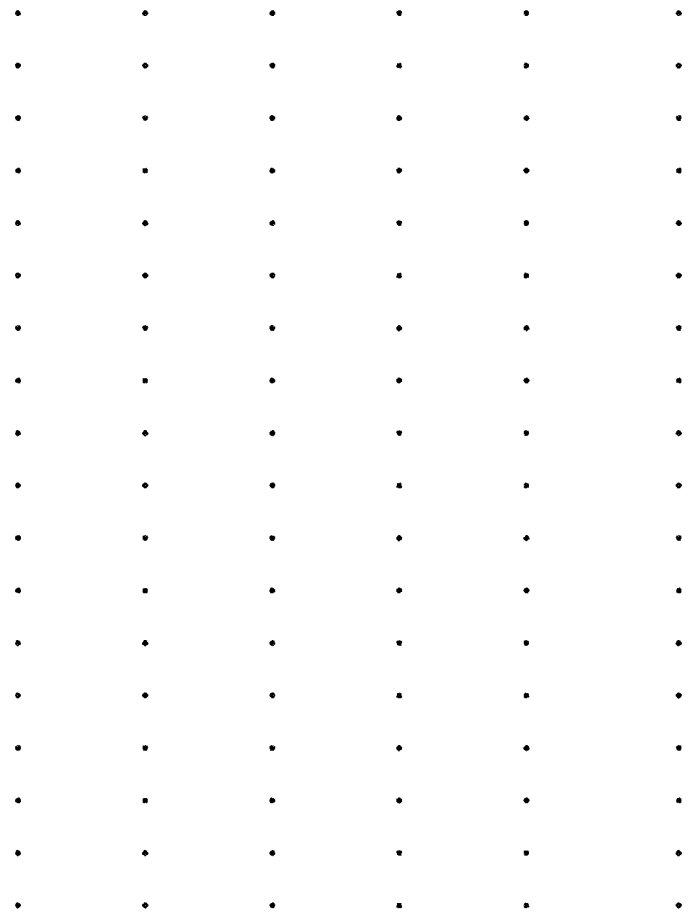
FIG. 9 is a lane line key point image obtained by performing sampling to obtain a key point of each lane line in the lane line image in FIG. 8 according to another embodiment.

The sampling may occur after a refinement of the lane line area. As one example, FIG. 9 is a lane line key point image obtained by performing sampling to obtain a key point of each lane line in the lane line image in FIG. 8 according to an embodiment.

S704. Obtain three-dimensional coordinate information corresponding to the key point according to a spatial mapping relationship between a two-dimensional grayscale image and three-dimensional point cloud data. In one implementation, road-image data of a road may include the three-dimensional point cloud data of a to-be-processed road.

The lane line is still in a two-dimensional form after being sampled, and needs to be converted into a three-dimensional form, thereby facilitating subsequent fusion and splicing processing of lane line data. The two-dimensional grayscale image is obtained by processing the three-dimensional point cloud data. Therefore, there is the spatial mapping relationship between the three-dimensional point cloud data and the two-dimensional grayscale image. In this embodiment, the three-dimensional coordinate information of the key point is obtained according to the three-dimensional point cloud data corresponding to the key point by using the spatial mapping relationship. A two-dimensional lane line sampling result is converted into three-dimensional scattering point data according to a spatial mapping relationship between two-dimensional image data and three-dimensional laser point cloud data.

S706. Splice each lane line key point image according to the three-dimensional coordinate information of each key point and the lane line attribute, to obtain lane line data of the to-be-processed road.

As described above, to facilitate the extraction of the lane line area and the lane line attribute by the deep neural network model, the to-be-processed road is divided based on the three-dimensional point cloud data, and a plurality of continuous two-dimensional grayscale images of the to-be-processed road are obtained by processing. Therefore, the lane line key point image corresponding to each two-dimensional grayscale image needs to be spliced to obtain a complete lane line of the to-be-processed road.

Figure 10:
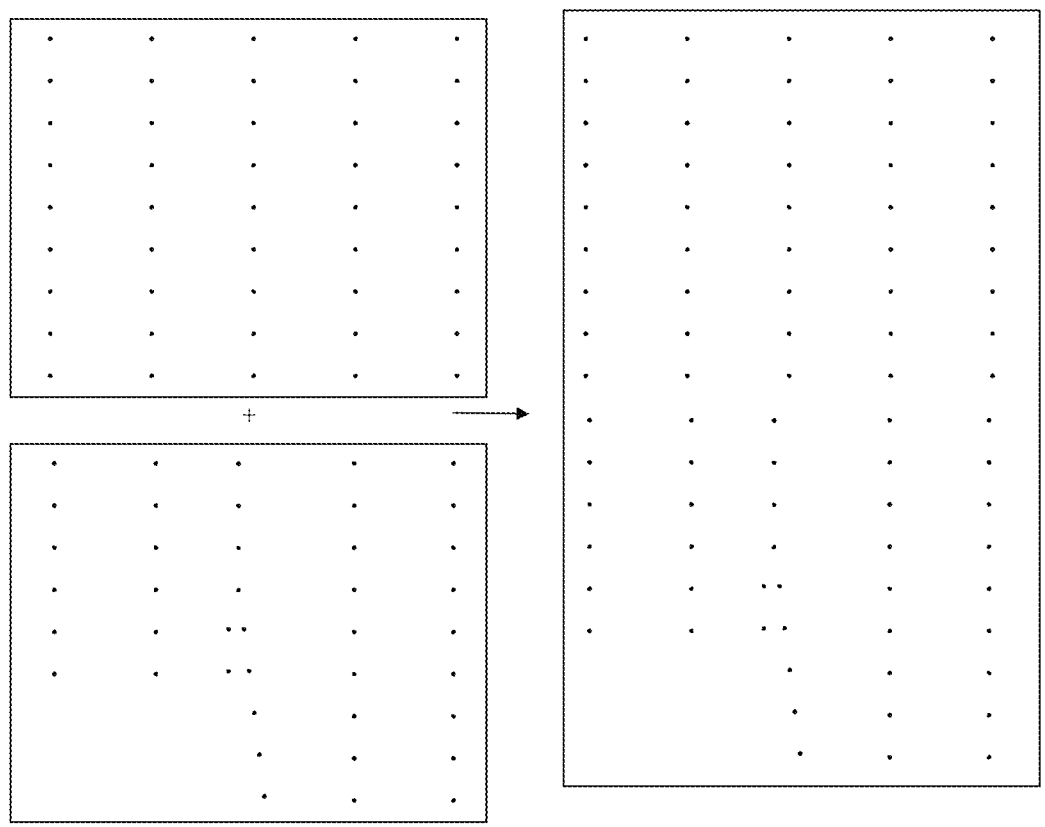
FIG. 10 is a schematic diagram of a process of splicing two lane line key point images according to an embodiment.

Specifically, whether two lane line area images are adjacent (that is, whether the road is continuous) is determined according to the three-dimensional coordinates. For two adjacent lane line area images, one lane line area is taken from each image for pairing. If locations of two to-be-paired lane line areas are continuous (coordinates are continuous), and dashed/solid attributes of the lane line areas are the same, the pairing is successful, and it is considered that the two lane line areas in the two lane line area images may be spliced into a long lane line area. By using the method, all lane line area images are spliced in sequence, to obtain a complete lane line area image corresponding to the to-be-processed road. FIG. 10 is a schematic diagram of splicing two lane line key point images according to an embodiment.

In this embodiment, through post-processing operations such as lane line refinement, lane line sampling, and splicing based on the key point, structural characteristics of the lane line and continuity of the lane line in a three-dimensional space are fully considered, and accuracy of lane line recognition is improved.

In another embodiment, before the splicing each lane line key point image according to the three-dimensional coordinate information of each key point and the lane line attribute, to obtain the lane line data of the to-be-processed road, the method further includes: identifying a noise lane line in the lane line key point image according to a lane line spacing and a lane line length in the lane line key point image, and filtering out the noise lane line.

The noise lane line refers to a non-real lane line, which may be determined according to a spacing of the lane line and the lane line length in the lane line key point image. The spacing of the lane line lane line is a spacing of real lane lines of the road. For roads with different standards, standards of the lane line spacing are unified. For example, a common lane line spacing is 3.75 m and a width of an emergency stop area is 3.5 m. The lane line length in the lane line key point image is associated with dividing of the three-dimensional point cloud data of the to-be-processed road. Generally, the three-dimensional point cloud data of every 45-m to-be-processed road is divided into a segment, and the lane line length in the lane line key point image is 45 m.

The noise lane line is filtered out, thereby improving splicing efficiency and accuracy of the lane line key point image.

In another embodiment, after a step of processing, for each lane line area image, the lane line area into a single-pixel lane line, to obtain a lane line image corresponding to each lane line area image, the method further includes: performing curve fitting on each extracted lane line.

The curve fitting refers to curve linearization. In this embodiment, to enable the obtained lane line to be smoother, a two-dimensional curve fitting method is used for performing curve fitting on the lane line, and the curve fitting method includes, but is not limited to, a polynomial equation-based least square fitting method, a Ransac based curve fitting method, and the like.

In another embodiment, after a step of splicing each lane line area image according to three-dimensional point cloud data corresponding to the lane line area image and the lane line attribute, to obtain spliced lane line data of the to-be-processed road, the method includes: breaking the spliced lane line data into one or more interval to obtain the lane line data of each interval. The breaking may accord to a quantity of lane lines, and a starting location and an ending location of each lane line. An interval may be also a divided interval.

Figure 11:
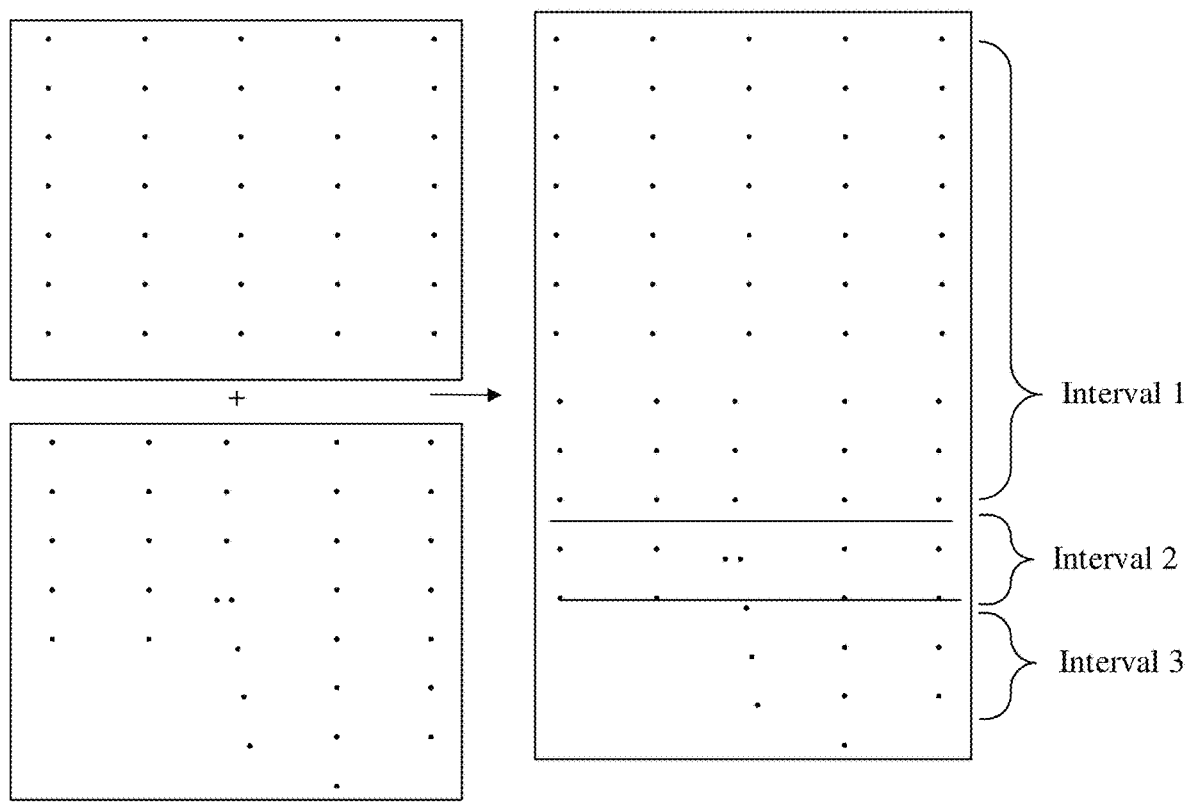
FIG. 11 is a schematic diagram of a process of breaking a lane line obtained through splicing shown in FIG. 10 to obtain a divided interval according to an embodiment.

The interval is a plurality of areas obtained by dividing by using broken lines after the lane line is broken. After the complete lane line obtained through splicing is broken to obtain the divided interval, a quantity of lane lines in the same interval remains unchanged, and the starting location and the ending location of the lane line need to be on the same horizontal line. FIG. 11 is a schematic diagram obtained by breaking the lane line obtained through splicing to obtain the divided interval shown in FIG. 10. As shown in FIG. 11, there are three intervals in total.

Specifically, first, the complete lane line obtained through splicing is divided and broken according to the starting location and the ending location of the lane line, ensuring that the starting location and the ending location of the lane line of each interval are on the same horizontal line, and smoothing processing is performed on a broken location.

Second, whether a quantity of lane lines in each interval is changed is detected, and if there is a change, breaking is performed by using an intersection point as a breaking point, and an interval is changed into two intervals. In actual application, at an entrance and an exit of an expressway, the entrance and the exit are added, and consequently, a quantity of lane lines is changed. Using the exit as an example, an intersection point between the exit and an adjacent lane line is used as a breaking point, to break a front interval.

Lane line data of the divided interval obtained after breaking is structured and can reflect a road structure. Through dividing of the interval, a structure of the lane line of each interval can be determined, for example, at an entrance of an expressway, at an exit of an expressway, or at a road fork, and it is convenient to make decisions for navigation, voice prompt, or self-driving.

Figure 12:
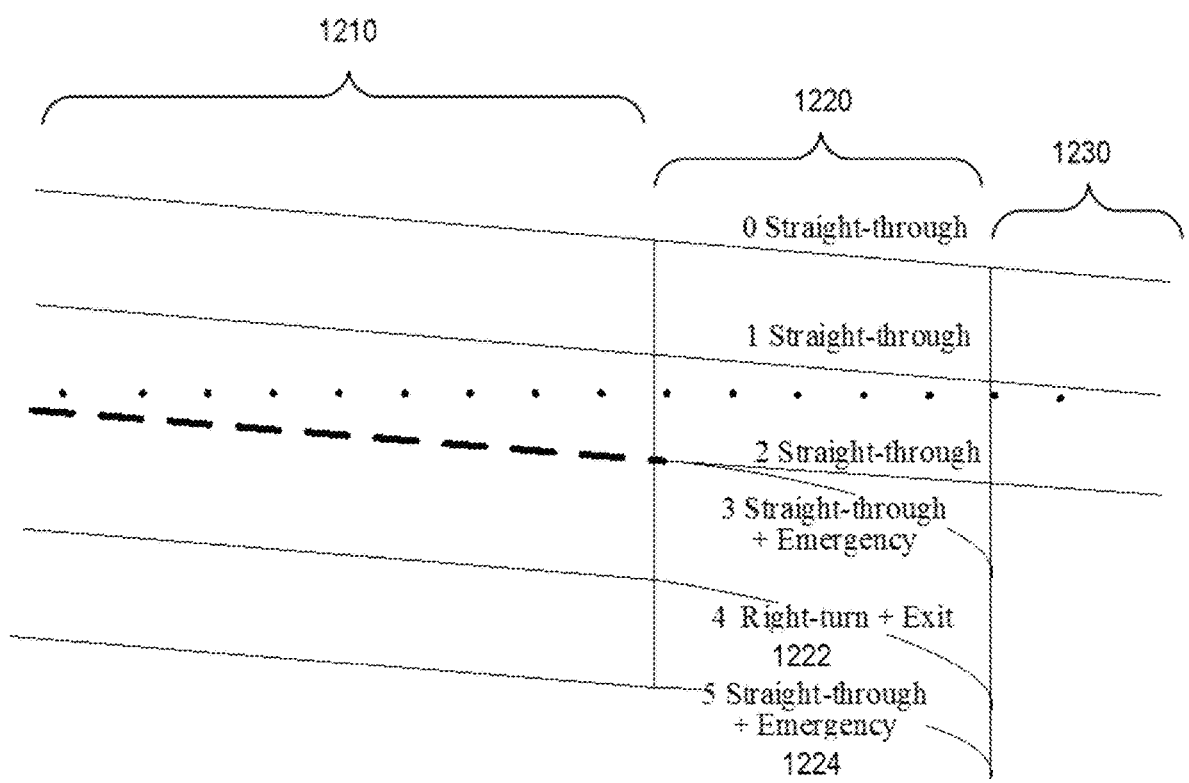
FIG. 12 is a schematic diagram of an extracted lane line displayed by a lane line editing system according to an embodiment.

In another embodiment, the lane line data of each interval is stored separately, to help load the extracted lane line data of intervals into a lane line editing system and help a map editor process the lane line data. FIG. 12 is a schematic diagram of an extracted lane line displayed by a lane line editing system according to an embodiment.

Figure 13:
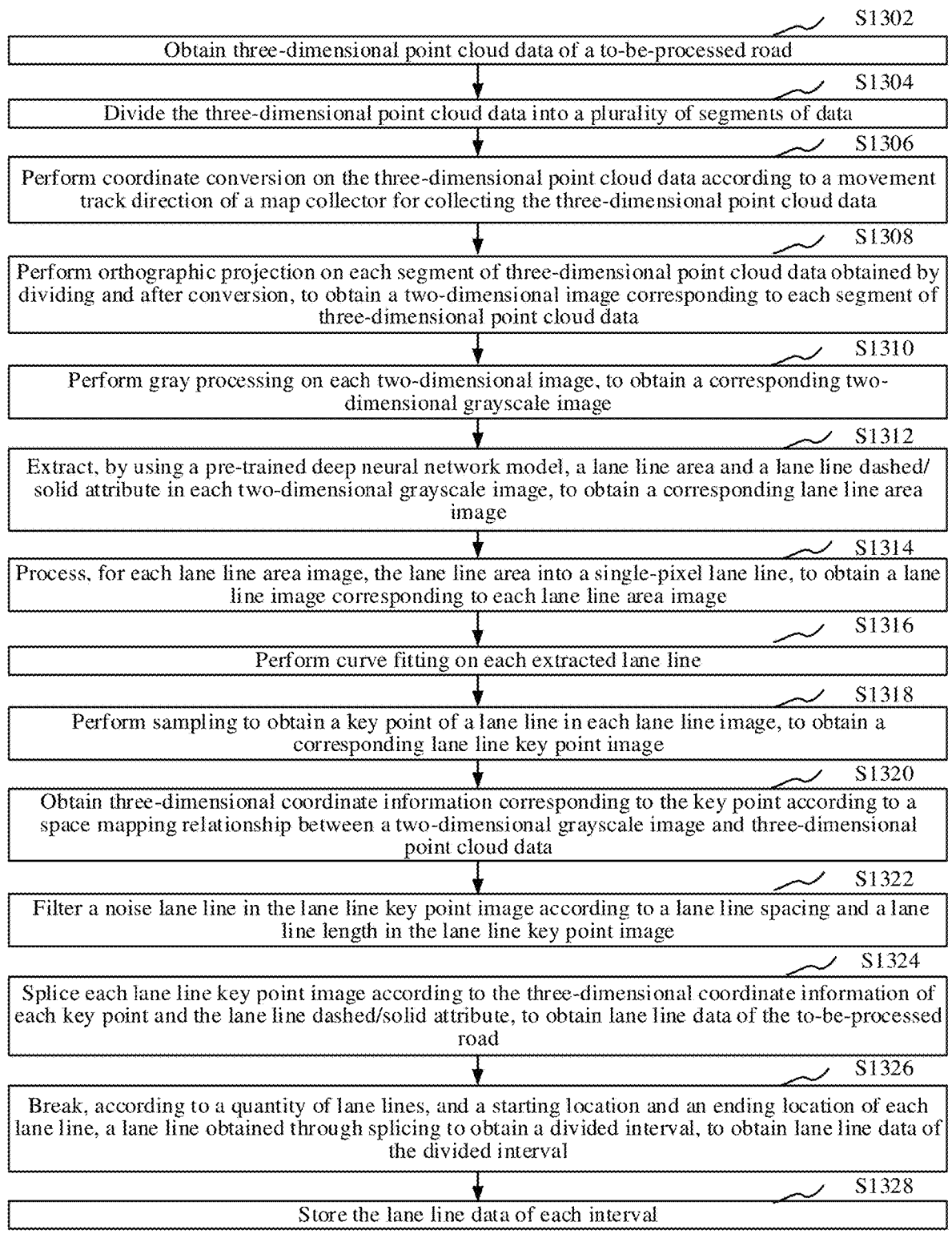
FIG. 13 is a schematic flowchart of a lane line data processing method according to an embodiment.

FIG. 13 is a schematic flowchart of a lane line data processing method according to an embodiment.

As shown in FIG. 13, the lane line data processing method includes the following steps:

S1302. Obtain three-dimensional point cloud data of a to-be-processed road. In one implementation, road-image data of a road may include the three-dimensional point cloud data of a to-be-processed road.

The three-dimensional point cloud data of the to-be-processed road is collected by using a map collector. The map collector is provided with a laser scanner. During driving on a road, a point data set of a road surface, that is, three-dimensional point cloud data of the road is obtained by using the laser scanner. The point cloud data, obtained according to a laser measuring principle, includes three-dimensional coordinates and a laser reflection strength.

S1304. Divide the three-dimensional point cloud data into a plurality of segments of data.

Specifically, three-dimensional point cloud data of every fixed-length road may be divided into a segment, for example, three-dimensional point cloud data of every 45-m road is divided into a segment.

S1306. Perform coordinate conversion on the three-dimensional point cloud data according to a movement track direction of a map collector for collecting the three-dimensional point cloud data.

Specifically, a conversion formula is:

$$\begin{bmatrix} \overline{X} \\ \overline{Y} \end{bmatrix} = \begin{bmatrix} \cos\theta & -\sin\theta \\ \sin\theta & \cos\theta \end{bmatrix} \begin{bmatrix} X \\ Y \end{bmatrix},$$

where θ represents a steering angle of the map collector,
$\overline{X}$ represents a horizontal coordinate after conversion,
$\overline{Y}$ represents a vertical coordinate after conversion, X represents a horizontal coordinate before conversion, and Y represents a vertical coordinate before conversion.

After the horizontal coordinate and the vertical coordinate of the three-dimensional point cloud data are converted according to the movement track direction of the map collector, three-dimensional curved data collected by the map collecting vehicle during steering is corrected, so that the lane line in the two-dimensional image obtained after performing orthographic projection remains vertical to facilitate recognition of the lane line by the deep neural network model.

S1308. Perform orthographic projection on each segment of three-dimensional point cloud data obtained by dividing and after conversion, to obtain a two-dimensional image corresponding to each segment of three-dimensional point cloud data.

The orthographic projection is performed on a laser point cloud to obtain the two-dimensional image, and a pixel value of the two-dimensional image is in direct proportion to a reflectivity value of the point cloud. In this embodiment, each segment of three-dimensional point cloud data is projected onto one two-dimensional image, and a road corresponding to a data segment is displayed on the two-dimensional image, so that a plurality of continuous two-dimensional images corresponding to the three-dimensional point cloud data of the to-be-processed road are obtained.

S1310. Perform gray processing on each two-dimensional image, to obtain a corresponding two-dimensional grayscale image.

In an embodiment, a two-dimensional grayscale image corresponding to a specific segment of road is shown in FIG. 3.

S1312. Extract, by using a pre-trained deep neural network model, a lane line area and a lane line attribute in each two-dimensional grayscale image, to obtain a corresponding lane line area image.

The lane line attribute includes a dashed line and a solid line. In this embodiment, the deep neural network model used for extracting the lane line area and the lane line attribute is pre-trained. The deep neural network model is trained based on a large quantity of marked two-dimensional grayscale images. In a training sample during model training, for the solid line, a solid line location is directly marked; and for the dashed line, a blank between two segments of dashed lines is connected to obtain a continuous line as a marking result. In this way, the deep neural network model is helped to learn a forward and backward extending relationship of the lane line, to filter out noises such as some characters and ground marks.

During model training, a deep neural network model is trained by using a marked lane line sample and is stored after the model is converged. A two-dimensional grayscale image of a to-be-processed road is inputted in a prediction stage, and the model extracts a lane line area and a dashed/solid attribute from the two-dimensional grayscale image. In an embodiment, a lane line extraction result is shown in FIG. 4.

Specifically, a VGG basic network and a structure of spatial pyramid pooling are used by the deep neural network model, dilated convolution is used between network layers, a deconvolution operation is used for upsampling, a weighted cross entropy loss is used by a loss function, and a structure of the deep neural network model is shown in FIG. 5.

In this embodiment, a lane line in a larger visual range is extracted by using the deep neural network model, which is not easily affected by interference items (for example, arrows on the ground, characters, and vehicles) in the point cloud and has stronger robustness compared with a common machine learning method.

S1314. Process, for each lane line area image, the lane line area into a single-pixel lane line, to obtain a lane line image corresponding to each lane line area image.

In an embodiment, a lane line area extraction result is shown in FIG. 4. The extracted lane line area occupies a plurality of pixel blocks. However, the lane line area of the plurality of pixel blocks does not facilitate subsequent calculation. Therefore, in this embodiment, the lane line area is processed into the single-pixel lane line.

Specifically, for each lane line area image, some pixels of the lane line area are deleted according to an eight-connected principle and a skeleton of the lane line area image is retained, to obtain the lane line image corresponding to each lane line area image. FIG. 8 is a lane line image obtained by processing the lane line area image in FIG. 4.

S1316. Perform curve fitting on each extracted lane line.

The curve fitting refers to curve linearization. In this embodiment, to enable the obtained lane line to be smoother, a two-dimensional curve fitting method is used for performing curve fitting on the lane line, and the curve fitting method includes, but is not limited to, a polynomial equation-based least square fitting method, a Ransac based curve fitting method, and the like.

S1318. Perform sampling to obtain a key point of a lane line in each lane line image, to obtain a corresponding lane line key point image.

The key point is a sparse point obtained after sampling the lane line area. In this embodiment, each lane line is sampled to obtain the key point of the lane line. The sampling is sampling at equal interval, for example, a point is obtained through sampling every two meters. FIG. 9 is a lane line key point image obtained by performing sampling to obtain a key point of each lane line in the lane line image in FIG. 8 according to an embodiment.

S1320. Obtain three-dimensional coordinate information corresponding to the key point according to a spatial mapping relationship between a two-dimensional grayscale image and three-dimensional point cloud data.

The lane line is still in a two-dimensional form after being sampled, and needs to be converted into a three-dimensional form, thereby facilitating subsequent fusion and splicing processing of lane line data. The two-dimensional grayscale image is obtained by processing the three-dimensional point cloud data. Therefore, there is the spatial mapping relationship between the three-dimensional point cloud data and the two-dimensional grayscale image. In this embodiment, the three-dimensional coordinate information of the key point is obtained according to the three-dimensional point cloud data corresponding to the key point by using the spatial mapping relationship. A two-dimensional lane line sampling result is converted into three-dimensional scattering point data according to a spatial mapping relationship between two-dimensional image data and three-dimensional laser point cloud data.

S1322. Filter a noise lane line in the lane line key point image according to a lane line spacing and a lane line length in the lane line key point image.

The noise lane line refers to a non-real lane line determined according to the lane line spacing and the lane line length in the lane line key point image. The lane line spacing is a real lane line spacing of the road. For roads with different standards, standards of the lane line spacing are unified. For example, a common lane line spacing is 3.75 m and a width of an emergency stop area is 3.5 m. The lane line length in the lane line key point image is associated with dividing of the three-dimensional point cloud data of the to-be-processed road. Generally, the three-dimensional point cloud data of every 45-m to-be-processed road is divided into a segment, and the lane line length in the lane line key point image is 45 m. The noise lane line is filtered, thereby improving splicing efficiency and accuracy of the lane line key point image.

S1324. Splice each lane line key point image according to the three-dimensional coordinate information of each key point and the lane line attribute, to obtain lane line data of the to-be-processed road.

As described above, to facilitate the extraction of the lane line area and the lane line attribute by the deep neural network model, the to-be-processed road is divided based on the three-dimensional point cloud data, and a plurality of continuous two-dimensional grayscale images of the to-be-processed road are obtained by processing. Therefore, the lane line key point image corresponding to each two-dimensional grayscale image needs to be spliced to obtain a complete lane line of the to-be-processed road.

Specifically, whether two lane line area images are adjacent (that is, whether the road is continuous) is determined according to the three-dimensional coordinates. For two adjacent lane line area images, one lane line area is taken from each image for pairing. If locations of two to-be-paired lane line areas are continuous (coordinates are continuous), and dashed/solid attributes of the lane line areas are the same, the pairing is successful, and it is considered that the two lane line areas in the two lane line area images may be spliced into a long lane line area. By using the method, all lane line area images are spliced in sequence, to obtain a complete lane line area image corresponding to the to-be-processed road. FIG. 10 is a schematic diagram of splicing two lane line key point images according to an embodiment.

S1326. Break, according to a quantity of lane lines, and a starting location and an ending location of each lane line, a lane line obtained through splicing to obtain a divided interval, to obtain lane line data of the divided interval.

The interval is a plurality of areas obtained by dividing by using broken lines after the lane line is broken. After the complete lane line obtained through splicing is broken to obtain the divided interval, a quantity of lane lines in the same interval needs to remain unchanged, and the starting location and the ending location of the lane line need to be on the same horizontal line. FIG. 11 is a schematic diagram obtained by breaking the lane line obtained through splicing to obtain the divided interval shown in FIG. 10. As shown in FIG. 11, there are three intervals in total that are an interval 1, an interval 2, and an interval 3 respectively. Specifically, as shown in FIG. 11, a quantity of lane lines obtained through splicing changes in a vehicle driving direction, and the quantity is increased from three lane lines to six lane lines, and then decreased to five lane lines. Lane lines are broken to obtain three intervals according to a principle of breaking a lane line to obtain a divided interval and according to quantities of lane lines, and starting locations and ending locations of the lane lines. There are five lane lines in the interval 1, there are six lane lines in the interval 2, and there are three lane lines in the interval 3.

Structured lane line data refers to lane line data reflecting a road structure, specifically, the lane line data of the divided interval. Through dividing of the interval, a structure of the lane line of each interval can be determined, for example, at an entrance of an expressway, at an exit of an expressway, or at a road fork, and it is convenient to make decisions for navigation, voice prompt, or self-driving. FIG. 12 is a schematic diagram of an extracted lane line displayed by a lane line editing system according to an embodiment. The lane line editing system loads and splices the lane line data of the interval 1 (1210), the lane line data of the interval 2 (1220), and the lane line data of the interval 3 (1230) in sequence, recognizes and displays each lane line attribute, and marks a structure of the lane line according to the lane line attribute and a change of a quantity of lane lines of each interval. For example, a lane line 4 (1222) of the interval 2 is a lane line of an exit of an expressway, and a lane line 5 (1224) of the interval 2 is a lane line of an emergency lane.

S1328. Store the lane line data of each interval.

The lane line data of each interval is stored separately, to help load the extracted lane line data of intervals into a lane line editing system and help a map editor process the lane line data.

By using the foregoing lane line data processing method, a lane line in a larger visual range is extracted by using the deep neural network model, which is not easily affected by interference items (for example, arrows on the ground, characters, and vehicles) in the point cloud and has stronger robustness. The lane line is roughly divided by using the deep neural network model, and a candidate area of the lane line is positioned rapidly, thereby greatly reducing the amount of data to be subsequently processed and improving processing efficiency. Through post-processing operations such as lane line refinement, lane line sampling, and splicing based on the key point, structural characteristics of the lane line and continuity of the lane line in a three-dimensional space are fully considered, and accuracy of lane line recognition is improved. The lane line attribute may be extracted by using the deep neural network model, and richer lane line information is provided, thereby saving manual marking costs. By using the method, the lane line data that may be represented in the high-precision map can be obtained. The method may accurately and efficiently recognize the lane line and may be used for mass production of high-precision lane line data.

Figure 14:
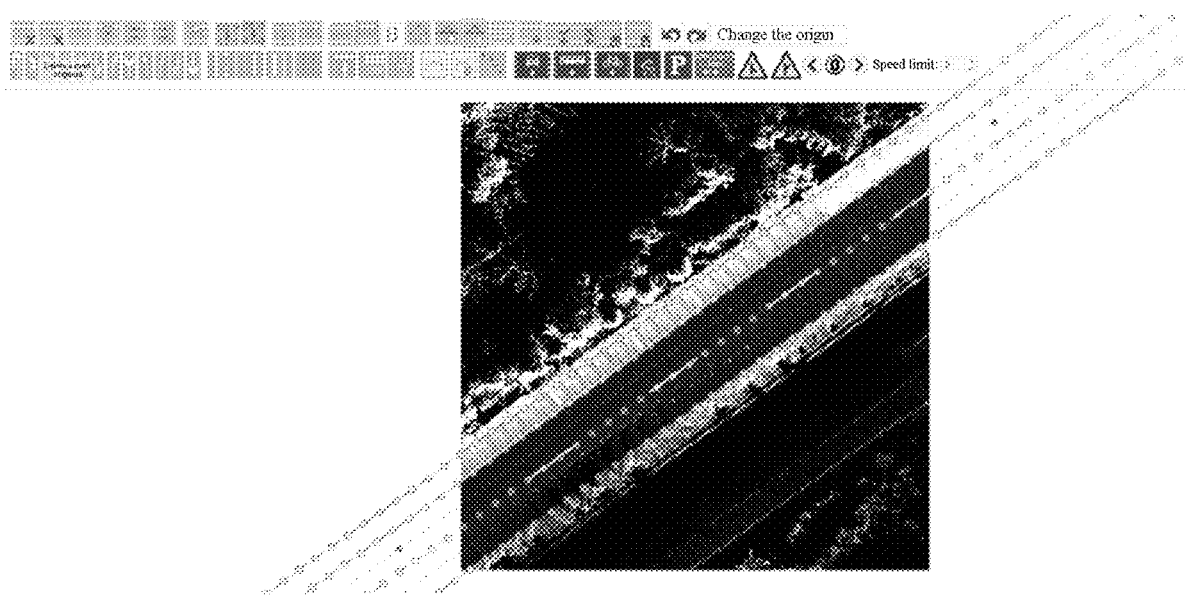
FIG. 14 is a schematic diagram of an interface of a lane line editing system.

The lane line data is pre-extracted, so that the editor may conveniently view a pre-extraction result in the editing system. The editor does not need to modify the lane line data whose extraction accuracy meets a requirement, thereby greatly reducing workload of the editor and improving editing efficiency. The method is applied to a high-precision map lane line data editing platform, and a display interface of the lane line editing system is shown in FIG. 14. After a user loads the pre-extracted lane line data, the editing system displays the lane line data represented by the key point, and the user may change a location and a shape of the lane line by editing the key point.

It is to be understood that, although the steps in the flowcharts of the foregoing embodiments are sequentially shown according to the indication of arrows, the steps are not necessarily sequentially performed according to the sequence indicated by the arrows. Unless explicitly specified in this application, the sequence of the steps is not strictly limited, and the steps may be performed in other sequences different from the figure. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps. Moreover, some steps in each of the foregoing embodiments may alternatively be combined into fewer steps to be performed.

Figure 15:
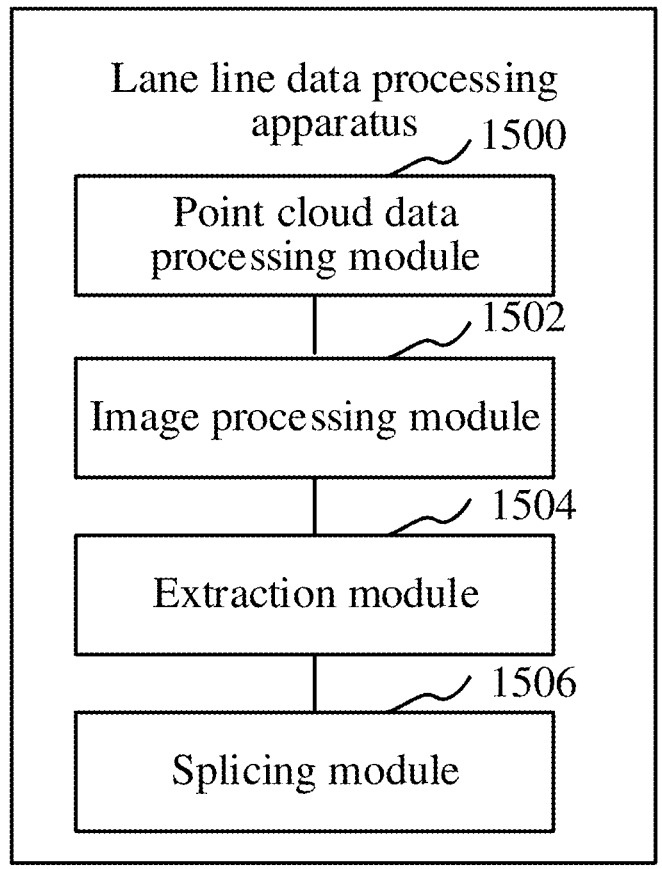
FIG. 15 is a structural block diagram of a lane line data processing apparatus according to an embodiment.

In an embodiment, as shown in FIG. 15, a lane line data processing apparatus is provided, including:
- a point cloud data processing module 1500, configured to obtain and divide three-dimensional point cloud data of a to-be-processed road; In one implementation, road-image data of a road may include the three-dimensional point cloud data of a to-be-processed road.
- an image processing module 1502, configured to process each segment of three-dimensional point cloud data obtained by dividing, to obtain a two-dimensional grayscale image of each segment of three-dimensional point cloud data;
- an extraction module 1504, configured to extract, by using a pre-trained deep neural network model, a lane line area and a lane line attribute in each two-dimensional grayscale image, to obtain a lane line area image corresponding to each two-dimensional grayscale image; and
- a splicing module 1506, configured to splice each lane line area image according to three-dimensional point cloud data corresponding to the lane line area image and the lane line attribute, to obtain lane line data of the to-be-processed road.

According to the lane line data processing apparatus, the three-dimensional point cloud data of the to-be-processed road is obtained and divided, each segment of three-dimensional point cloud data obtained by dividing is processed separately, to obtain the two-dimensional grayscale image of each segment of three-dimensional point cloud data, each two-dimensional grayscale image is inputted into the pre-trained deep neural network model, and the lane line area and the lane line attribute are extracted; and the three-dimensional point cloud data of the to-be-processed road includes the three-dimensional coordinates, so that each lane line area image can be spliced according to the three-dimensional point cloud data corresponding to the lane line area and the lane line attribute, to obtain the complete lane line data of the to-be-processed road. In addition, the lane line area and the lane line attribute are extracted by using the pre-trained deep neural network model. On one hand, the lane line attribute is obtained and lane line information is enriched, thereby saving manual marking costs and improving processing efficiency. On the other hand, lane line area extraction is not easily affected by interference items such as characters and vehicles in the three-dimensional point cloud data, thereby improving accuracy of the lane line area extraction.

Figure 16:
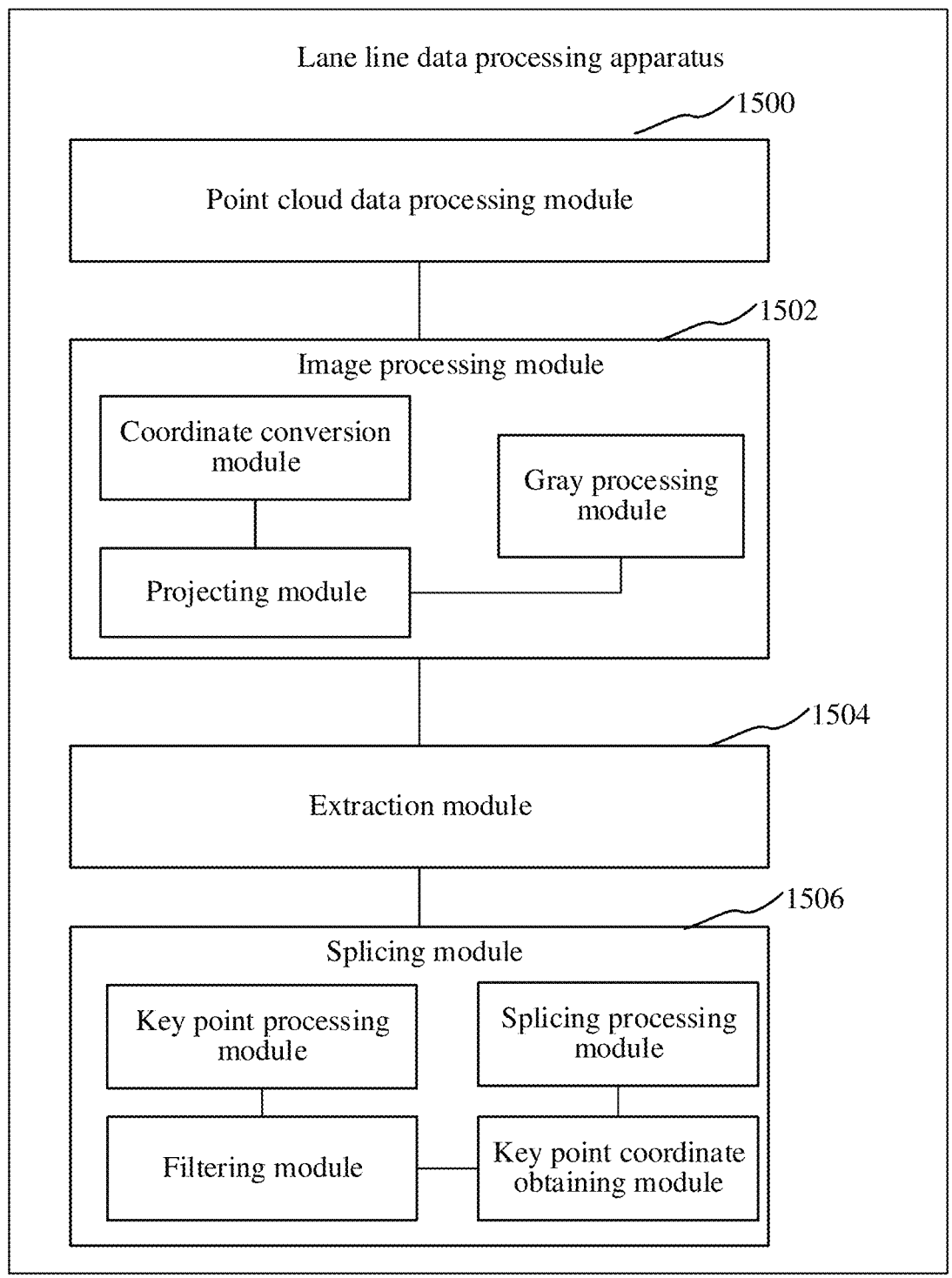
FIG. 16 is a structural block diagram of a lane line data processing apparatus according to another embodiment.

In an embodiment, as shown in FIG. 16, the splicing module includes: a key point processing module, a key point coordinate obtaining module, and a splicing processing module.

The key point processing module is configured to perform sampling to obtain a key point of the lane line area in the lane line area image, to obtain a lane line key point image of the lane line area image.

Specifically, the key point processing module includes a projecting module, a refining module, and a sampling module.

The refining module is configured to process, for each lane line area image, the lane line area into a single-pixel lane line, to obtain a lane line image corresponding to each lane line area image.

Specifically, for each lane line area image, some pixels of the lane line area are deleted according to an eight-connected principle and a skeleton of the lane line area image is retained, to obtain the lane line image corresponding to each lane line area image.

The sampling module is configured to perform sampling to obtain a key point of a lane line in each lane line image, to obtain a lane line key point image of the lane line image.

The key point coordinate obtaining module is configured to obtain three-dimensional coordinate information corresponding to the key point according to a spatial mapping relationship between the two-dimensional grayscale image and the three-dimensional point cloud data.

The splicing processing module is configured to splice each lane line key point image according to the three-dimensional coordinate information of each key point and the lane line attribute, to obtain the lane line data of the to-be-processed road.

In this embodiment, through post-processing operations such as lane line refinement, lane line sampling, and splicing based on the key point, structural characteristics of the lane line and continuity of the lane line in a three-dimensional space are fully considered, and accuracy of lane line recognition is improved.

In another embodiment, the splicing module further includes: a filtering module, configured to filter a noise lane line in the lane line key point image according to a lane line spacing and a lane line length in the lane line key point image.

The noise lane line is filtered, thereby improving splicing efficiency and accuracy of the lane line key point image.

In an embodiment, the image processing module includes:
a projecting module, configured to perform orthographic projection on each segment of three-dimensional point cloud data, to obtain a corresponding two-dimensional image; and
a gray processing module, configured to perform gray processing on each two-dimensional image, to obtain a corresponding two-dimensional grayscale image.

In this embodiment, three-dimensional point cloud data of a to-be-processed road is collected by using a map collector, and a two-dimensional grayscale image of the to-be-processed road is obtained through processing based on the three-dimensional point cloud data, to provide a basis for a deep neural network model to extract a lane line.

In an embodiment, the image processing module further includes:
a coordinate conversion module, configured to perform coordinate conversion on the three-dimensional point cloud data according to a movement track direction of a map collector for collecting the three-dimensional point cloud data.

In an embodiment, the apparatus further includes:
a breaking module, configured to break, according to a quantity of lane lines, and a starting location and an ending location of each lane line, a lane line obtained through splicing to obtain a divided interval, to obtain lane line data of the divided interval.

Structured lane line data refers to lane line data reflecting a road structure, specifically, the lane line data of the divided interval. Through dividing of the interval, a structure of the lane line of each interval can be determined, for example, at an entrance of an expressway, at an exit of an expressway, or at a road fork, and it is convenient to make decisions for navigation, voice prompt, or self-driving.

In another embodiment, the splicing module further includes a curve fitting module, configured to perform curve fitting on each extracted lane line. Through curve fitting, the obtained lane line is smoother.

Figure 17:
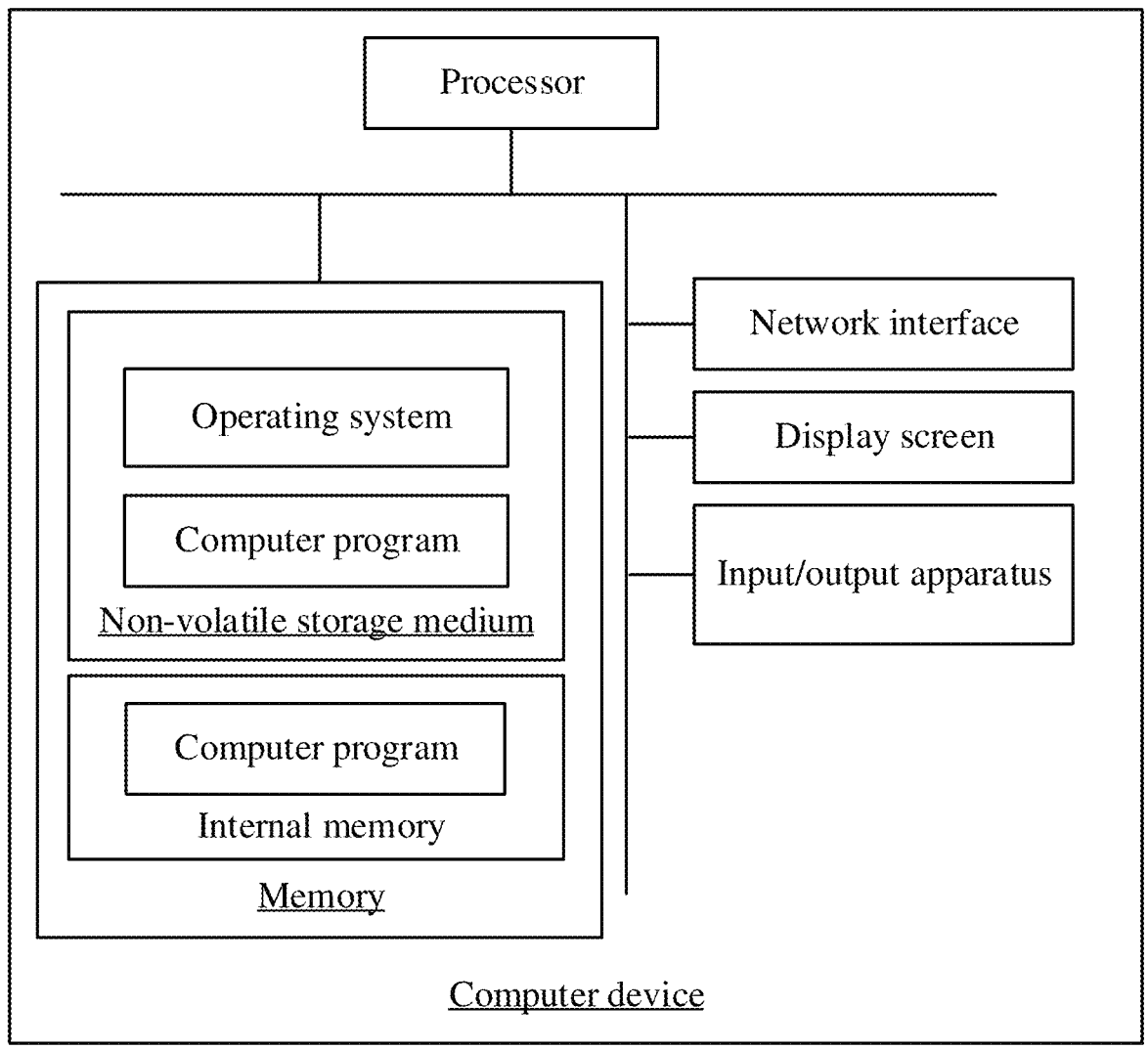
FIG. 17 is a structural block diagram of a computer device according to an embodiment.

FIG. 17 is a diagram of an internal structure of a computer device according to an embodiment. The computer device may be specifically the computer device 102 in FIG. 1. As shown in FIG. 17, the computer device includes a processor, a memory, a network interface, an input/output apparatus and a display screen that are connected by using a system bus. The memory includes a non-volatile storage medium and an internal memory. The non-volatile storage medium of the computer device stores an operating system and may further store a computer program, the computer program, when executed by the processor, causing the processor to implement the lane line data processing method. The internal memory may also store a computer program, the computer program, when executed by the processor, causing the processor to perform the lane line data processing method. The display screen of the computer device may be a liquid crystal display screen or an electronic ink display screen. The input/output apparatus of the computer device may be a touch layer covering the display screen, or may be a key, a trackball or a touch pad disposed on a housing of the computer device, and may be further an external keyboard, a touch pad, a mouse, or the like.

A person skilled in the art may understand that, the structure shown in FIG. 17 is only a block diagram of a partial structure related to the solution in this application, and does not limit the computer device to which the solution of this application is applied. Specifically, the computer device may include more components or fewer components than those shown in the figure, or some components may be combined, or a different component deployment may be used.

In an embodiment, the lane line data processing apparatus provided in this application may be implemented in a form of a computer program, and the computer program may be run on the computer device shown in FIG. 17. The memory of the computer device may store program modules forming the lane line data processing apparatus, for example, the point cloud data processing module, the image processing module, the extraction module, and the splicing module shown in FIG. 15. The computer program formed by the program modules causes the processor to perform the steps in the lane line data processing method in the embodiments of this application described in this specification.

For example, the computer device shown in FIG. 17 may perform, by using the point cloud data processing module in the lane line data processing apparatus shown in FIG. 15, a step of obtaining and dividing three-dimensional point cloud data of a to-be-processed road. The image processing module performs a step of processing each segment of three-dimensional point cloud data obtained by dividing, to obtain a two-dimensional grayscale image of each segment of three-dimensional point cloud data. The computer device may perform, by using the extraction module, a step of extracting, by using a pre-trained deep neural network model, a lane line area and a lane line attribute in each two-dimensional grayscale image, to obtain a lane line area image corresponding to each two-dimensional grayscale image. The computer device may perform, by using the splicing module, a step of splicing each lane line area image according to three-dimensional point cloud data corresponding to the lane line area image and the lane line attribute, to obtain lane line data of the to-be-processed road.

In an embodiment, a computer device includes a memory and a processor, the memory storing a computer program, and the computer program, when executed by the processor, causing the processor to perform the following steps:
obtaining and dividing three-dimensional point cloud data of a to-be-processed road;
processing each segment of three-dimensional point cloud data obtained by dividing, to obtain a two-dimensional grayscale image of each segment of three-dimensional point cloud data;
extracting, by using a pre-trained deep neural network model, a lane line area and a lane line attribute in each two-dimensional grayscale image, to obtain a lane line area image corresponding to each two-dimensional grayscale image; and splicing each lane line area image according to three-dimensional point cloud data corresponding to the lane line area image and the lane line attribute, to obtain lane line data of the to-be-processed road.

In an embodiment, the splicing each lane line area image according to three-dimensional point cloud data corresponding to the lane line area image and the lane line attribute, to obtain lane line data of the to-be-processed road includes:
performing sampling to obtain a key point of the lane line area in the lane line area image, to obtain a lane line key point image of the lane line area image;
obtaining three-dimensional coordinate information corresponding to the key point according to a spatial mapping relationship between the two-dimensional grayscale image and the three-dimensional point cloud data; and
splicing each lane line key point image according to the three-dimensional coordinate information of each key point and the lane line attribute, to obtain the lane line data of the to-be-processed road.

In an embodiment, the performing sampling to obtain a key point of the lane line area in the lane line area image, to obtain a lane line key point image of the lane line area image includes:
processing, for each lane line area image, the lane line area into a single-pixel lane line, to obtain a lane line image corresponding to each lane line area image; and
performing sampling to obtain a key point of a lane line in each lane line image, to obtain a lane line key point image of the lane line image.

In an embodiment, before the splicing each lane line key point image according to the three-dimensional coordinate information of each key point and the lane line attribute, to obtain the lane line data of the to-be-processed road, the following step is further included:
filtering a noise lane line in the lane line key point image according to a lane line spacing and a lane line length in the lane line key point image.

In an embodiment, the processing each segment of three-dimensional point cloud data obtained by dividing, to obtain a two-dimensional grayscale image of each segment of three-dimensional point cloud data includes:
performing orthographic projection on each segment of three-dimensional point cloud data obtained by dividing, to obtain a two-dimensional image corresponding to each segment of three-dimensional point cloud data; and
performing gray processing on each two-dimensional image, to obtain a corresponding two-dimensional grayscale image.

In an embodiments, before the performing orthographic projection on each segment of three-dimensional point cloud data obtained by dividing, to obtain a two-dimensional image corresponding to each segment of three-dimensional point cloud data, the following step is further included: performing coordinate conversion on the three-dimensional point cloud data according to a movement track direction of a map collector for collecting the three-dimensional point cloud data.

In an embodiment, when executed by the processor, the computer program causes the processor to further perform the following step:
breaking, according to a quantity of lane lines, and a starting location and an ending location of each lane line, a lane line obtained through splicing to obtain a divided interval, to obtain lane line data of the divided interval.

The processing, for each lane line area image, the lane line area into a single-pixel lane line, to obtain a lane line image corresponding to each lane line area image includes: deleting, for each lane line area image according to an eight-connected principle, some pixels of the lane line area and retaining a skeleton of the lane line area image, to obtain the lane line image corresponding to each lane line area image.

In an embodiment, a computer-readable storage medium stores a computer program, the computer program, when executed by a processor, causing the processor to perform the following steps:
obtaining and dividing three-dimensional point cloud data of a to-be-processed road;
processing each segment of three-dimensional point cloud data obtained by dividing, to obtain a two-dimensional grayscale image of each segment of three-dimensional point cloud data;
extracting, by using a pre-trained deep neural network model, a lane line area and a lane line attribute in each two-dimensional grayscale image, to obtain a lane line area image corresponding to each two-dimensional grayscale image; and
splicing each lane line area image according to three-dimensional point cloud data corresponding to the lane line area image and the lane line attribute, to obtain lane line data of the to-be-processed road.

In an embodiment, the splicing each lane line area image according to three-dimensional point cloud data corresponding to the lane line area image and the lane line attribute, to obtain lane line data of the to-be-processed road includes:
performing sampling to obtain a key point of the lane line area in the lane line area image, to obtain a lane line key point image of the lane line area image;
obtaining three-dimensional coordinate information corresponding to the key point according to a spatial mapping relationship between the two-dimensional grayscale image and the three-dimensional point cloud data; and
splicing each lane line key point image according to the three-dimensional coordinate information of each key point and the lane line attribute, to obtain the lane line data of the to-be-processed road.

In an embodiment, the performing sampling to obtain a key point of the lane line area in the lane line area image, to obtain a lane line key point image of the lane line area image includes:
processing, for each lane line area image, the lane line area into a single-pixel lane line, to obtain a lane line image corresponding to each lane line area image; and
performing sampling to obtain a key point of a lane line in each lane line image, to obtain a lane line key point image of the lane line image.

In an embodiment, before the splicing each lane line key point image according to the three-dimensional coordinate information of each key point and the lane line attribute, to obtain the lane line data of the to-be-processed road, the following step is further included:
filtering a noise lane line in the lane line key point image according to a lane line spacing and a lane line length in the lane line key point image.

In an embodiment, the processing each segment of three-dimensional point cloud data obtained by dividing, to obtain a two-dimensional grayscale image of each segment of three-dimensional point cloud data includes:
performing orthographic projection on each segment of three-dimensional point cloud data obtained by dividing, to obtain a two-dimensional image corresponding to each segment of three-dimensional point cloud data; and performing gray processing on each two-dimensional image, to obtain a corresponding two-dimensional grayscale image.

In an embodiment, before the performing orthographic projection on each segment of three-dimensional point cloud data obtained by dividing, to obtain a two-dimensional image corresponding to each segment of three-dimensional point cloud data, the following step is further included: performing coordinate conversion on the three-dimensional point cloud data according to a movement track direction of a map collector for collecting the three-dimensional point cloud data.

In an embodiment, when executed by the processor, the computer program causes the processor to further perform the following step:

breaking, according to a quantity of lane lines, and a starting location and an ending location of each lane line, a lane line obtained through splicing to obtain a divided interval, to obtain lane line data of the divided interval.

In an embodiment, the processing, for each lane line area image, the lane line area into a single-pixel lane line, to obtain a lane line image corresponding to each lane line area image includes: deleting, for each lane line area image according to an eight-connected principle, some pixels of the lane line area and retaining a skeleton of the lane line area image, to obtain the lane line image corresponding to each lane line area image.

A person of ordinary skill in the art may understand that all or some of the procedures of the methods in the embodiments may be implemented by a computer program instructing relevant hardware. The program may be stored in a computer-readable storage medium. When the program is run, the procedures of the methods in the embodiments are performed. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a rambus direct RAM (RDRAM), a direct rambus dynamic RAM (DRDRAM), and a rambus dynamic RAM (DRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only describe several implementations of this application, and are described in detail, but they are not to be construed as a limitation to the patent scope of this application. A person of ordinary skill in the art may further make variations and improvements without departing from the ideas of this application, which all fall within the protection scope of this application. Therefore, the protection scope of this application is to be subject to the protection scope of the appended claims.

What is claimed is:

1. A method for obtaining lane line data of a road, the method comprising:
   obtaining and dividing, by a device comprising a memory storing instructions and a processor in communication with the memory, road-image data of a road into at least one segment;
   processing, by the device, each segment to obtain a two-dimensional grayscale image of each segment;
   extracting, by the device using a pre-trained deep neural network model, a lane line area and a lane line attribute in each two-dimensional grayscale image, to obtain a lane line area image of each segment; and
   splicing, by the device, each lane line area image based on corresponding road-image data and the lane line attribute, to obtain lane line data of the road by:
      performing, by the device, sampling to obtain at least one key point of the lane line area in the lane line area image, to obtain a lane line key point image of the lane line area image;
      obtaining, by the device, three-dimensional coordinate information corresponding to the at least one key point according to a spatial mapping relationship between the two-dimensional grayscale image and the road-image data; and
      splicing, by the device, each lane line key point image according to the three-dimensional coordinate information of each key point and the lane line attribute, to obtain the lane line data of the road,
   wherein the performing sampling to obtain the at least one key point of the lane line area in the lane line area image, to obtain the lane line key point image of the lane line area image comprises:
      processing, by the device for each lane line area image, the lane line area into a single-pixel lane line, to obtain a lane line image corresponding to each lane line area image by:
         deleting, for each lane line area image according to a determining rule, some pixels of the lane line area and retaining a skeleton of the lane line area image, to obtain the lane line image corresponding to each lane line area image, and
      performing, by the device, sampling to obtain a key point of a lane line in each lane line image, to obtain the lane line key point image of the lane line image.

2. The method according to claim 1, wherein, before the splicing each lane line key point image according to the three-dimensional coordinate information of each key point and the lane line attribute, to obtain the lane line data of the road, the method further comprises:
   filtering out, by the device, a noise lane line in the lane line key point image according to a lane line spacing and a lane line length in the lane line key point image.

3. The method according to claim 1, wherein the processing each segment to obtain the two-dimensional grayscale image of each segment comprises:
   performing, by the device, orthographic projection on each segment to obtain a two-dimensional image corresponding to each segment; and
   performing, by the device, gray processing on each two-dimensional image, to obtain a corresponding two-dimensional grayscale image.

4. The method according to claim 3, wherein, before the performing the orthographic projection on each segment to obtain a two-dimensional image corresponding to each segment, the method further comprises:
performing, by the device, coordinate conversion on the road-image data according to a movement track direction of a map collector for collecting the road-image data.

5. The method according to claim 4, further comprises:
breaking, by the device, the spliced lane line data into at least one divided interval according to a quantity of lane lines and a starting location and an ending location of each lane line.

6. A device for obtaining lane line data of a road, the device comprising:
a memory storing instructions; and
a processor in communication with the memory, wherein, when the processor executes the instructions, the processor is configured to cause the device to:
obtain and dividing road-image data of a road into at least one segment,
process each segment to obtain a two-dimensional grayscale image of each segment,
extract, using a pre-trained deep neural network model, a lane line area and a lane line attribute in each two-dimensional grayscale image, to obtain a lane line area image of each segment, and
splice each lane line area image based on corresponding road-image data and the lane line attribute, to obtain lane line data of the road by:
performing sampling to obtain at least one key point of the lane line area in the lane line area image, to obtain a lane line key point image of the lane line area image;
obtaining three-dimensional coordinate information corresponding to the at least one key point according to a spatial mapping relationship between the two-dimensional grayscale image and the road-image data; and
splicing each lane line key point image according to the three-dimensional coordinate information of each key point and the lane line attribute, to obtain the lane line data of the road,
wherein the performing sampling to obtain the at least one key point of the lane line area in the lane line area image, to obtain the lane line key point image of the lane line area image comprises:
processing, for each lane line area image, the lane line area into a single-pixel lane line, to obtain a lane line image corresponding to each lane line area image by:
deleting, for each lane line area image according to a determining rule, some pixels of the lane line area and retaining a skeleton of the lane line area image, to obtain the lane line image corresponding to each lane line area image, and
performing sampling to obtain a key point of a lane line in each lane line image, to obtain the lane line key point image of the lane line image.

7. The device according to claim 6, wherein, before the processor is configured to cause the device to splice each lane line key point image according to the three-dimensional coordinate information of each key point and the lane line attribute, to obtain the lane line data of the road, the processor is configured to cause the device to:
filter out a noise lane line in the lane line key point image according to a lane line spacing and a lane line length in the lane line key point image.

8. The device according to claim 6, wherein, when the processor is configured to cause the device to process each segment to obtain the two-dimensional grayscale image of each segment, the processor is configured to cause the device to:
perform orthographic projection on each segment to obtain a two-dimensional image corresponding to each segment; and
perform gray processing on each two-dimensional image, to obtain a corresponding two-dimensional grayscale image.

9. The device according to claim 8, wherein, before the processor is configured to cause the device to perform the orthographic projection on each segment to obtain a two-dimensional image corresponding to each segment, the processor is configured to cause the device to:
perform coordinate conversion on the road-image data according to a movement track direction of a map collector for collecting the road-image data.

10. The device according to claim 9, wherein, when the processor executes the instructions, the processor is configured to further cause the device to:
break the spliced lane line data into at least one divided interval according to a quantity of lane lines and a starting location and an ending location of each lane line.

11. A non-transitory computer readable storage medium storing computer readable instructions, wherein, the computer readable instructions, when executed by a processor, are configured to cause the processor to perform:
obtaining and dividing road-image data of a road into at least one segment;
processing each segment to obtain a two-dimensional grayscale image of each segment;
extracting, using a pre-trained deep neural network model, a lane line area and a lane line attribute in each two-dimensional grayscale image, to obtain a lane line area image of each segment; and
splicing each lane line area image based on corresponding road-image data and the lane line attribute, to obtain lane line data of the road by:
performing sampling to obtain at least one key point of the lane line area in the lane line area image, to obtain a lane line key point image of the lane line area image;
obtaining three-dimensional coordinate information corresponding to the at least one key point according to a spatial mapping relationship between the two-dimensional grayscale image and the road-image data; and
splicing each lane line key point image according to the three-dimensional coordinate information of each key point and the lane line attribute, to obtain the lane line data of the road,
wherein the performing sampling to obtain the at least one key point of the lane line area in the lane line area image, to obtain the lane line key point image of the lane line area image comprises:
processing, for each lane line area image, the lane line area into a single-pixel lane line, to obtain a lane line image corresponding to each lane line area image by:
deleting, for each lane line area image according to a determining rule, some pixels of the lane line area and retaining a skeleton of the lane line area image, to obtain the lane line image corresponding to each lane line area image, and performing sampling to obtain a key point of a lane line in each lane line image, to obtain the lane line key point image of the lane line image.

12. The non-transitory computer readable storage medium according to claim 11, wherein, before the computer readable instructions are configured to cause the processor to perform splicing each lane line key point image according to the three-dimensional coordinate information of each key point and the lane line attribute, to obtain the lane line data of the road, the computer readable instructions are configured to cause the processor to perform:

filtering out a noise lane line in the lane line key point image according to a lane line spacing and a lane line length in the lane line key point image.

13. The non-transitory computer readable storage medium according to claim 11, wherein, when the computer readable instructions are configured to cause the processor to perform processing each segment to obtain the two-dimensional grayscale image of each segment, the computer readable instructions are configured to cause the processor to perform:

performing orthographic projection on each segment to obtain a two-dimensional image corresponding to each segment; and performing gray processing on each two-dimensional image, to obtain a corresponding two-dimensional grayscale image.

14. The non-transitory computer readable storage medium according to claim 13, wherein, before the computer readable instructions are configured to cause the processor to perform the orthographic projection on each segment to obtain a two-dimensional image corresponding to each segment, the computer readable instructions are configured to cause the processor to perform:

performing coordinate conversion on the road-image data according to a movement track direction of a map collector for collecting the road-image data.

\* \* \* \* \*